US008792118B2

(12) United States Patent
Vendrow et al.

(10) Patent No.: US 8,792,118 B2
(45) Date of Patent: Jul. 29, 2014

(54) USER INTERFACES AND METHODS TO PROVISION ELECTRONIC FACSIMILES

(75) Inventors: Vlad Vendrow, Redwood City, CA (US); Bruce Young, San Jose, CA (US)

(73) Assignee: RingCentral Inc., San Mateo, CA (US)

( * ) Notice: Subject to any disclaimer, the term of this patent is extended or adjusted under 35 U.S.C. 154(b) by 1039 days.

(21) Appl. No.: 12/234,600

(22) Filed: Sep. 19, 2008

(65) Prior Publication Data
US 2009/0080029 A1    Mar. 26, 2009

Related U.S. Application Data

(60) Provisional application No. 60/995,573, filed on Sep. 26, 2007.

(51) Int. Cl.
*G06F 3/12* (2006.01)
*H04N 1/00* (2006.01)
*H04B 1/38* (2006.01)

(52) U.S. Cl.
USPC ........... 358/1.15; 358/403; 358/439; 455/557

(58) Field of Classification Search
USPC ........ 358/1.15, 402, 403, 407, 434, 439, 440, 358/442, 450, 468; 382/305, 306; 379/100.09, 142.05, 88.19; 370/352, 370/400
See application file for complete search history.

(56) References Cited

U.S. PATENT DOCUMENTS

| 5,191,613 A | 3/1993 | Graziano et al. |
| 5,195,131 A | 3/1993 | Sano |
| 5,329,578 A | 7/1994 | Brennan et al. |
| 5,530,740 A | 6/1996 | Irribarren et al. |
| 5,712,712 A * | 1/1998 | Sayward ................ 358/403 |
| 5,717,742 A | 2/1998 | Hyde-Thomson |
| 5,799,065 A | 8/1998 | Junqua et al. |

(Continued)

FOREIGN PATENT DOCUMENTS

| AU | 59362/96 A | 5/1996 |
| AU | 59362/96 | 12/1996 |

(Continued)

OTHER PUBLICATIONS

Copenheaver, Blaine R.; Notification of the Transmittal of the International Search report and Written Opinion of the International Searching Authority, or the Declaration; International Application No. PCT/US2008/077546; Date of Mailing Dec. 8, 2008; Form PCT/ISA/220 (1 Page); Form PCT/ISA/210 (2 pages); Form PCT/ISA/237 (5 pages).

(Continued)

*Primary Examiner* — Steven Kau
*Assistant Examiner* — Neil R McLean
(74) *Attorney, Agent, or Firm* — Weaver Austin Villeneuve & Sampson LLP

(57) ABSTRACT

Embodiments of the invention relate generally to computing devices and systems, as well as software, computer programs, applications, and user interfaces, and more particularly, to provisioning electronic fax messages in a communication network including packetized and/or synchronous communications. According to one embodiment, a messaging can receive data representing an electronic document in a file format into a messaging system, convert fax components to a fax compatible format including the electronic document in the file format to form converted fax components, determine whether to generate an electronic facsimile to include the fax components as a pre-rendered electronic facsimile, and transmit the electronic facsimile as the pre-rendered electronic facsimile.

20 Claims, 19 Drawing Sheets

(56) References Cited

U.S. PATENT DOCUMENTS

| | | | |
|---|---|---|---|
| 5,889,845 A | 3/1999 | Staples et al. | |
| 5,896,448 A | 4/1999 | Holt | |
| 5,987,535 A | 11/1999 | Knodt et al. | |
| 6,038,451 A | 3/2000 | Syed et al. | |
| 6,041,110 A | 3/2000 | Lautenschlager et al. | |
| 6,104,790 A | 8/2000 | Narayanaswami | |
| 6,230,024 B1 * | 5/2001 | Wang et al. | 455/557 |
| 6,377,950 B1 | 4/2002 | Peters et al. | |
| 6,442,404 B1 | 8/2002 | Sakajiri | |
| 6,542,475 B1 | 4/2003 | Bala et al. | |
| 6,584,093 B1 | 6/2003 | Salama et al. | |
| 6,587,555 B1 | 7/2003 | Cripe et al. | |
| 6,760,324 B1 | 7/2004 | Scott et al. | |
| 6,792,085 B1 | 9/2004 | Rigaldies et al. | |
| 6,801,341 B1 | 10/2004 | Joffe et al. | |
| 6,801,520 B2 | 10/2004 | Philonenko | |
| 6,801,819 B1 | 10/2004 | Barto et al. | |
| 6,816,483 B1 | 11/2004 | Beckstrom et al. | |
| 6,870,910 B1 | 3/2005 | Armstrong et al. | |
| 6,879,676 B1 | 4/2005 | Contractor | |
| 6,901,139 B2 | 5/2005 | Gonzalez et al. | |
| 6,950,507 B1 | 9/2005 | Kaplan | |
| 6,967,947 B1 | 11/2005 | Chen et al. | |
| 6,987,840 B1 | 1/2006 | Bosik et al. | |
| 6,993,360 B2 | 1/2006 | Plahte et al. | |
| 6,993,561 B2 | 1/2006 | Lincke et al. | |
| 6,999,469 B1 | 2/2006 | Chu et al. | |
| 7,006,614 B2 | 2/2006 | Feinberg et al. | |
| 7,024,457 B1 | 4/2006 | Newman et al. | |
| 7,024,474 B2 | 4/2006 | Clubb et al. | |
| 7,031,437 B1 | 4/2006 | Parsons et al. | |
| 7,047,525 B2 | 5/2006 | Prunty et al. | |
| 7,068,763 B2 | 6/2006 | Burrell et al. | |
| 7,076,558 B1 | 7/2006 | Dunn | |
| 7,110,523 B2 | 9/2006 | Gagle et al. | |
| 7,123,608 B1 | 10/2006 | Scott et al. | |
| 7,162,020 B1 | 1/2007 | Forte | |
| 7,180,638 B1 * | 2/2007 | Hou et al. | 358/439 |
| 7,184,527 B1 | 2/2007 | Lin et al. | |
| 7,245,913 B1 | 7/2007 | Nguyen et al. | |
| 7,254,643 B1 | 8/2007 | Peters et al. | |
| 7,274,684 B2 | 9/2007 | Young et al. | |
| 7,298,833 B2 | 11/2007 | Klein et al. | |
| 7,308,255 B2 | 12/2007 | Loveland | |
| 7,324,635 B2 | 1/2008 | Wood et al. | |
| 7,333,820 B2 | 2/2008 | Sheha et al. | |
| 7,359,368 B1 | 4/2008 | Pearce | |
| 7,369,648 B1 | 5/2008 | Chang | |
| 7,426,218 B1 | 9/2008 | Archer et al. | |
| 7,480,714 B2 | 1/2009 | Wakabayashi | |
| 7,640,293 B2 | 12/2009 | Wilson et al. | |
| 7,702,669 B2 | 4/2010 | Vendrow et al. | |
| 7,734,294 B2 | 6/2010 | Kent et al. | |
| 7,783,735 B1 | 8/2010 | Sebes et al. | |
| 7,822,186 B1 | 10/2010 | Boni | |
| 7,996,036 B1 | 8/2011 | Chen et al. | |
| 8,000,454 B1 | 8/2011 | Or-Bach et al. | |
| 8,020,486 B2 | 9/2011 | Yamamoto et al. | |
| 8,457,113 B2 | 6/2013 | Wood et al. | |
| 2002/0064149 A1 * | 5/2002 | Elliott et al. | 370/352 |
| 2002/0067714 A1 | 6/2002 | Crain et al. | |
| 2002/0080025 A1 | 6/2002 | Beattie | |
| 2002/0085701 A1 | 7/2002 | Parsons et al. | |
| 2002/0120697 A1 | 8/2002 | Generous et al. | |
| 2002/0120699 A1 | 8/2002 | Wakabayashi | |
| 2002/0122547 A1 | 9/2002 | Hinchey et al. | |
| 2003/0007625 A1 | 1/2003 | Pines et al. | |
| 2003/0008612 A1 | 1/2003 | Andreason | |
| 2003/0017860 A1 | 1/2003 | Choi | |
| 2003/0095541 A1 | 5/2003 | Chang et al. | |
| 2003/0186686 A1 | 10/2003 | Yang et al. | |
| 2004/0005042 A1 | 1/2004 | Dhara et al. | |
| 2004/0028208 A1 | 2/2004 | Carnazza et al. | |
| 2004/0111305 A1 | 6/2004 | Gavan et al. | |
| 2004/0120479 A1 | 6/2004 | Creamer et al. | |
| 2004/0121814 A1 | 6/2004 | Creamer et al. | |
| 2004/0146050 A1 | 7/2004 | Burrell et al. | |
| 2004/0160951 A1 | 8/2004 | Galvin et al. | |
| 2004/0193543 A1 | 9/2004 | Nord et al. | |
| 2004/0202300 A1 | 10/2004 | Cooper et al. | |
| 2004/0203918 A1 | 10/2004 | Moriguchi et al. | |
| 2004/0204038 A1 | 10/2004 | Suzuki et al. | |
| 2004/0218748 A1 | 11/2004 | Fisher | |
| 2004/0229620 A1 | 11/2004 | Zhao et al. | |
| 2005/0047373 A1 | 3/2005 | Kojima | |
| 2005/0047579 A1 | 3/2005 | Salame | |
| 2005/0083915 A1 * | 4/2005 | Mathew et al. | 370/352 |
| 2005/0088686 A1 | 4/2005 | Tanimoto | |
| 2005/0117733 A1 | 6/2005 | Widger et al. | |
| 2005/0141479 A1 | 6/2005 | Ozugur et al. | |
| 2005/0153739 A1 * | 7/2005 | Halsell | 455/557 |
| 2005/0180551 A1 | 8/2005 | Meek et al. | |
| 2005/0195802 A1 | 9/2005 | Klein et al. | |
| 2005/0207556 A1 | 9/2005 | Gonzalez et al. | |
| 2005/0226473 A1 | 10/2005 | Ramesh | |
| 2006/0008066 A1 | 1/2006 | Starling et al. | |
| 2006/0018454 A1 | 1/2006 | Nonaka et al. | |
| 2006/0023657 A1 | 2/2006 | Woodson et al. | |
| 2006/0030357 A1 | 2/2006 | McConnell et al. | |
| 2006/0085516 A1 | 4/2006 | Farr et al. | |
| 2006/0099931 A1 | 5/2006 | Trujilo | |
| 2006/0116127 A1 | 6/2006 | Wilhoite et al. | |
| 2006/0126806 A1 | 6/2006 | Trandal et al. | |
| 2006/0135202 A1 | 6/2006 | Ho et al. | |
| 2006/0160566 A1 | 7/2006 | Plahte et al. | |
| 2006/0161435 A1 | 7/2006 | Atef et al. | |
| 2006/0205436 A1 | 9/2006 | Liu et al. | |
| 2006/0210050 A1 | 9/2006 | Bartfeld et al. | |
| 2006/0215543 A1 | 9/2006 | Croak et al. | |
| 2006/0253895 A1 | 11/2006 | Brandofino et al. | |
| 2007/0022213 A1 | 1/2007 | Fahmy et al. | |
| 2007/0047534 A1 | 3/2007 | Hakusui | |
| 2007/0058637 A1 | 3/2007 | Lo | |
| 2007/0060137 A1 | 3/2007 | Yeatts et al. | |
| 2007/0070976 A1 | 3/2007 | Mussman et al. | |
| 2007/0105531 A1 | 5/2007 | Schroeder, Jr. | |
| 2007/0111716 A1 | 5/2007 | Leigh et al. | |
| 2007/0115498 A1 | 5/2007 | Noel et al. | |
| 2007/0115978 A1 | 5/2007 | Kondo | |
| 2007/0173237 A1 | 7/2007 | Roundtree | |
| 2007/0198677 A1 | 8/2007 | Ozhan et al. | |
| 2007/0236749 A1 * | 10/2007 | Henry et al. | 358/402 |
| 2007/0253545 A1 | 11/2007 | Chatterjee et al. | |
| 2007/0266077 A1 | 11/2007 | Wengrovitz | |
| 2008/0002820 A1 | 1/2008 | Shtiegman et al. | |
| 2008/0032704 A1 | 2/2008 | O'Neil et al. | |
| 2008/0032716 A1 | 2/2008 | Forte | |
| 2008/0037763 A1 | 2/2008 | Shaffer | |
| 2008/0043976 A1 | 2/2008 | Maximo et al. | |
| 2008/0056234 A1 | 3/2008 | Sprague | |
| 2008/0075261 A1 | 3/2008 | Ramanathan et al. | |
| 2008/0144804 A1 | 6/2008 | Mergen | |
| 2008/0186929 A1 | 8/2008 | Rice et al. | |
| 2008/0240376 A1 | 10/2008 | Conway et al. | |
| 2008/0279362 A1 | 11/2008 | Yasrebi et al. | |
| 2008/0298567 A1 | 12/2008 | Guile | |
| 2009/0015876 A1 | 1/2009 | Brown | |
| 2009/0029724 A1 | 1/2009 | Hardy et al. | |
| 2009/0054032 A1 | 2/2009 | Ren et al. | |
| 2009/0059818 A1 | 3/2009 | Pickett | |
| 2009/0080029 A1 | 3/2009 | Vendrow et al. | |
| 2009/0086278 A1 | 4/2009 | Vendrow et al. | |
| 2009/0086947 A1 | 4/2009 | Vendrow | |
| 2009/0097632 A1 | 4/2009 | Carnazza et al. | |
| 2009/0116466 A1 | 5/2009 | Lee et al. | |
| 2009/0154666 A1 | 6/2009 | Rios et al. | |
| 2009/0154678 A1 | 6/2009 | Kewin et al. | |
| 2009/0202050 A1 | 8/2009 | Berger et al. | |
| 2009/0296907 A1 | 12/2009 | Vendrow et al. | |
| 2009/0310598 A1 | 12/2009 | Winbladh et al. | |
| 2010/0002626 A1 | 1/2010 | Schmidt et al. | |
| 2010/0029272 A1 | 2/2010 | McCann et al. | |
| 2010/0035594 A1 | 2/2010 | Vendrow et al. | |
| 2010/0039676 A1 | 2/2010 | Noel et al. | |

(56) References Cited

U.S. PATENT DOCUMENTS

| | | |
|---|---|---|
| 2010/0039677 A1 | 2/2010 | Noel et al. |
| 2010/0039678 A1 | 2/2010 | Noel et al. |
| 2010/0039679 A1 | 2/2010 | Noel et al. |
| 2010/0046037 A1 | 2/2010 | Noel et al. |
| 2010/0046731 A1 | 2/2010 | Gisby et al. |
| 2010/0080214 A1 | 4/2010 | Li et al. |
| 2010/0081380 A1 | 4/2010 | Lim et al. |
| 2010/0099390 A1 | 4/2010 | Vendrow et al. |
| 2010/0113013 A1 | 5/2010 | Karabinis et al. |
| 2010/0128291 A1 | 5/2010 | Vendrow et al. |
| 2010/0128861 A1 | 5/2010 | Vendrow et al. |
| 2010/0128862 A1 | 5/2010 | Vendrow |
| 2010/0128867 A1 | 5/2010 | Vendrow et al. |
| 2010/0130172 A1 | 5/2010 | Vendrow et al. |
| 2010/0130213 A1 | 5/2010 | Vendrow et al. |
| 2010/0130228 A1 | 5/2010 | Vendrow et al. |
| 2010/0183134 A1 | 7/2010 | Vendrow et al. |
| 2010/0184408 A1 | 7/2010 | Vendrow et al. |
| 2010/0185584 A1 | 7/2010 | Vendrow et al. |
| 2011/0053643 A1 | 3/2011 | Shmunis |
| 2011/0110511 A1 | 5/2011 | Vendrow et al. |
| 2011/0130168 A1 | 6/2011 | Vendrow et al. |
| 2011/0153668 A1 | 6/2011 | Walker et al. |
| 2011/0177797 A1 | 7/2011 | Vendrow et al. |
| 2011/0191441 A1 | 8/2011 | Herriman et al. |
| 2011/0238510 A1 | 9/2011 | Rowen et al. |
| 2011/0293083 A1 | 12/2011 | Larson et al. |
| 2013/0057925 A1 | 3/2013 | Shmunis et al. |

FOREIGN PATENT DOCUMENTS

| | | |
|---|---|---|
| CN | 200410083593 | 4/2005 |
| CN | 101809986 | 8/2010 |
| EP | 0954193 A2 | 11/1999 |
| EP | 2 193 655 A1 | 6/2010 |
| JP | 1054889 A | 3/1989 |
| JP | 11-251893 | 9/1999 |
| JP | 2002-314642 | 10/2002 |
| JP | 2002314642 | 10/2002 |
| JP | 2007-006288 | 1/2007 |
| JP | 2007006288 | 1/2007 |
| KR | 1020000023675 A | 4/2000 |
| KR | 1020010011139 A | 2/2001 |
| KR | 2001-0077413 | 8/2001 |
| KR | 1020000005207 A | 8/2001 |
| KR | 1020020086695 A | 11/2002 |
| KR | 1020040039569 A | 5/2004 |
| KR | 1020050014088 A | 2/2005 |
| KR | 1020050000884 A | 6/2005 |
| KR | 1020050061255 A | 6/2005 |
| KR | 1020050116096 A | 12/2005 |
| KR | 1020060018155 A | 2/2006 |
| KR | 1020060096568 A | 9/2006 |
| KR | 1020060115833 A | 11/2006 |
| KR | 1020070006314 A | 1/2007 |
| KR | 100815239 B1 | 3/2008 |
| KR | 1020080029682 A | 4/2008 |
| KR | 1020090058808 A | 6/2009 |
| KR | 1020100065221 A | 6/2010 |
| WO | 9511578 A1 | 4/1995 |
| WO | 9638975 A1 | 12/1996 |
| WO | WO 96/38975 | 12/1996 |
| WO | 9823080 A2 | 5/1998 |
| WO | 9827754 A2 | 6/1998 |
| WO | 9834391 A2 | 8/1998 |
| WO | 9847298 A2 | 10/1998 |
| WO | WO 98/47295 | 10/1998 |
| WO | 2006/022421 | 1/2006 |
| WO | 2006022421 A1 | 3/2006 |
| WO | 2006056983 A2 | 6/2006 |
| WO | 2007025950 A1 | 3/2007 |
| WO | 2007053420 A2 | 5/2007 |
| WO | 2008074122 A1 | 6/2008 |
| WO | WO 2009/042701 | 4/2009 |
| WO | 2010059756 A2 | 5/2010 |
| WO | 2010062981 A2 | 6/2010 |
| WO | WO 2010/065168 | 6/2010 |

OTHER PUBLICATIONS

Copenheaver, Blaine R.; Notification of the Transmittal of the International Search report and Written Opinion of the International Searching Authority, or the Declaration; International Application No. PCT/US2008/077683; Date of Mailing Dec. 10, 2008; Form PCT/ISA/220 (1 Page); Form PCT/ISA/210 (2 pages); Form PCT/ISA/237 (6 pages).

Commissioner; Notification of Transmittal of the International Search Report and the Written Opinion of the International Searching Authority, or the Declaration; International Application No, PCT/US2009/065969; Date of Mailing May 28, 2010; Form PCT/ISA/220 (4 pages); Form PCT/ISA/210 (3 pages); Form PCT/ISA/237 (4 pages).

Baharlou, Simin; Notification Concerning Transmittal of International Preliminary Report on Patentability (Chapter 1 of the Patent CooperationTreaty); International Application No. PCT/US2009/065969; Date of Mailing Jun. 9, 2011; Form PCT/IB/326 (1 page); Form PCT/IB/373 (1 page); Form PCT/ISA/237 (4 pages).

Nickitas-Etienne, Athina; Notification Concerning Transmittalof International Preliminary Report on Patentability (Chapter 1 of the Patent Cooperation Treaty); International Application No. PCT/US2009/065036; Date of Mailing Jun. 3, 2011; Form PCT/IB/326 (1 page); Form PCT/IB/373 (1 page); Form PCT/ISA/237 (5 pages).

Commissioner; Notification of Transmittal of the International Search Report and the Written Opinion of the International Searching Authority, or the Declaration; International Application No. PCT/US2009/065036; Date of Mailing Jul. 9, 2010; Form PCT/ISA/220 (2 pages); Form PCT/ISA/210 (3 pages); Form PCT/ISA/237 (5 pages).

"Call Routing Rules," IBM Lotis Sametine Unified Telephony Administrator's Guide, IBM Corp., 2009, p. 177; see also, Call Routing Rules <http://publib.boulder.ibm.com/infocenter/sametime/v8r0/index.jsp?topic=/com.ibm.help.sametime.telephony.doc/sut_adm_monitor_rules_c.html>.

Kunwadee Sripanidkulchai, Zon-Yin Shae< Debanjan Saha, "Call Routing Management in Enterprise VoIP Networks," INM '07, Aug. 27-31, 2001, ACM SIGCOMM Workshop, pp. 1-6, Kyoto, Japan.

Copenheaver, Blaine R., Notification of Transmittal of the International Search Report and the Written Opinion of the International Searching Authority, or the Declaration, PCT/US2009/045703, Jul. 29, 2009, Form PCT/ISA/220 (3 pages), PTO/ISA/210 (2 pages).

Mariane L'Ecuyer, "Using Skills-based Routing to Enhance Contact Center Revenue and Performance. (Call Center/CRM Management Scope)," The Free Library (May 1, 2003) <http://www.thefreelibrary.com/Using+skills-based+routing+to+enhance+contact+center+revenue+and...-a0102137613>.

"California Inventors Develop Caller Identification Based Call Routing Feature," US Fed News Service, Including US State News, Jan. 29, 2008, p. 1-2.

G. Konstantoulakis, M. Sloman, "Call Management Policy Specification for the Asterisk Telephone Private Branch Exchange," IEEE Workshop on Policies for Distributed Systems and Networks (Policy 2007), Jun. 13, 2007, pp. 1-11, Bologna, Italy.

"Remote access RADIUS attributes: Remote Access, "Microsoft Technet, Microsoft Corporation, <http://technet.microsoft.com/en-us/library/cc728366(WS.10),aspx> (last updated Jan. 21, 2005).

Helen J. Wang, Bhaskaran Raman, Chen-Nee Chuah, Rahul Biswas, Ramakrishna Gummadi, Barbara Hohlt, Xia Hong, Emre Kiciman, Zhuoqing Mao, Jimmy S. Shih, Lakshminarayanan Subramanian, Ben Y. Zhao, Anthony D. Joseph, Randy H. Katz, "Iceberg: An Internet-core Network Architecture for Integrated Communication," pp. 1-13, IEEE Personal Communications, vol. 7, Issue 4 (Aug. 2000).

Derek Lam, Jan Jannink, Donald C. Cox, Jennifer Widom, "Modeling Location Management in Personal Communication Services," Oct. 18, 1995, pp. 1-27, IEEE International Conference on Universial Personal Communications, 1996.

(56) References Cited

OTHER PUBLICATIONS

Derek Lam, Jan Jannink, Donald C. Cox, Jennifer Widom, "Teletraffic Modeling for Personal Communication Services," IEEE Communications Magazine, Feb. 1997, pp. 1-9, Stanford University.

S. Lynne Stokes, Betsy S. Greenberg, "A Priority System to Improve Callback Success in Telephone Surveys," Proceedings of the Survey Research Methods Section American Statistical Association, 1990, pp. 742-747, University of Texas at Austin, Austin, Texas.

Petros Maniatis, Mema Roussopoulos, Ed Swierk, Kevin Lai, Guido Appenzeller, Xinhua Zhao, Mary Baker, "The Mobile People Architecture," ACM SIGMOBILE Mobile Computing and Communications Review, vol. 3, Issue 3 (Jul. 1999), pp. 36-42; see also, <http://portal.acm.org/citation.cfm?id=329153>.

Gihwan Cho, Lindsay F. Marshall, "An Efficient Location and Routing Scheme for Mobile Computing Environments," IEEE Journal on Selected Areas in Communications, Jun. 1995, pp. 1-11, vol. 13, Issue 5.

Matthew Mintz-Habib, Anshuman Rawat, Henning Schulzrinne, Xiaotao Wu, "A VoIP Emergency Services Architecture and Prototype,"Computer Communications and Networks, Issue date Oct. 17-19, 2005, pp. 1-6, Columbia University.

International Preliminary Report on Patentability in Application No. PCT/US2009/051751, dated May 5, 2011, 7 pages.

International Search Report for International Application No. PCT/US2009/045703 mailed Jul. 29, 2009, 2 pages.

International Search report and Written Opinion in International Application No. PCT/US2009/051751, dated Mar. 5, 2010.

International Search Report in International Application No. PCT/US2009/065976, dated Jul. 2, 2010.

International Written Opinion in International Application No. PCT/US2009/065976, dated May 26, 2011.

International Preliminary Report on Patentability in International Application No. PCT/US2009/065976, dated May 31, 2011.

International Search Report in International Application No. PCT/US2009/065038, dated Jul. 2, 2010.

International Written Opinion in International Application No. PCT/US2009/065038, dated May 24, 2011.

International Preliminary Report on Patentability in International Application No. PCT/US2009/065038, dated May 24, 2011.

International Search Report in International Application No. PCT/US2009/051768, dated Jun. 10, 2010.

International Written Opinion in International Application No. PCT/US2009/051768, dated May 25, 2011.

International Preliminary Report on Patentability in International Application No. PCT/US2009/051768, dated May 24, 2011.

International Search Report in International Application No. PCT/US2009/065985, dated Jun. 22, 2010.

International Written Opinion in International Application No. PCT/US2009/065985, dated May 25, 2011.

International Preliminary Report on Patentability in International Application No. PCT/US2009/065985, dated May 31, 2011.

International Search Report in International Application No. PCT/US2009/065055, dated Jul. 7, 2010.

International Written Opinion in International Application No. PCT/US2009/065055, dated May 24, 2011.

International Preliminary Report on Patentability in International Application No. PCT/US2009/065055, dated May 24, 2011.

International Search Report in International Application No. PCT/US2009/065987, dated Jul. 14, 2010.

International Written Opinion in International Application No. PCT/US2009/065987, dated May 25, 2011.

International Preliminary Report on Patentability in International Application No. PCT/US2009/065987, dated May 31, 2011.

International Search Report in International Application No. PCT/US2009/051598, dated Apr. 1, 2010.

International Written Opinion in International Application No. PCT/US2009/051598, dated Feb. 7, 2011.

International Preliminary Report on Patentability in International Application No. PCT/US2009/051598, dated Feb. 8, 2011.

International Search Report in International Application No. PCT/US2010/044196, dated May 3, 2011.

International Written Opinion in International Application No. PCT/US2010/044196, dated Mar. 1, 2012.

International Preliminary Report on Patentability in International Application No. PCT/US2010/044196, dated Mar. 6, 2012.

International Search Report in International Application No. PCT/US2010/052880, dated Jun. 30, 2011.

International Search Report in International Application No. PCT/US2010/058569, dated Aug. 22, 2011.

International Search Report in International Application No. PCT/US2010/022075, dated Jul. 28, 2011.

"Automated Phone Trees: Two Potential Solutions,"[online] Jul. 5, 2009; Retrieved from the Internet URL: http://developmentality.wordpress.com/2009/07/05/automated-phone-trees-two-potential-solutions/; 3 pages.

Asterisk I. T.: "Asterfax—Asterisk Fax," Aug. 25, 2007, XP002598206 Retrieved from the Internet: URL: http://web.archive,org/web/20070825233700/http://asterfax.sourceforge.net/index.html [retrived on Aug. 24, 2010].

Marcin Kaluza: "Fax Services: Send Any Printable File From Your Program in Window 2000" MSDN Magazine, Aug. 31, 2001, XP002598207 Retrieved from the Internet: URL: http://msdn.microsoft.com/en-us/magazine/cc301661.aspx [retrived on Aug. 24, 2010].

European Search Report in European Patent Application No. 08835856.9-2414/2193654, dated Jan. 30, 2012.

International Written Opinion in International Application No. PCT/US2008/077683, dated Mar. 28, 2010.

International Preliminary Report on Patentability in International Application No. PCT/US2008/077683, dated Mar. 30, 2010.

International Initial Publication with ISR in International Application No. PCT/US2008/077683, dated Apr. 9, 2009.

European Search Report in European Patent Application No. 08833690.4-1522/2193655, dated Sep. 9, 2010.

Copenheaver Blaine R.; Notification of the Transmittal of the International Search Report and Written Opinion of the International Searching Authority, or the Declaration; International Application No. PCT/US2008/077546; Date of Mailing Dec. 8, 2008; Form PCT/ISA/220 (1 Page); Form PCT/ISA/210 (2 Pages); Form PCT/ISA/237 (5 Pages).

PCT International Preliminary Report on Patentability and Written Opinion dated Mar. 30, 2010 issued in PCT/US2008/077546.

European Office Action dated Apr. 21, 2011 issued in European Patent Application No. 08833690.4-1522/2193655.

Chinese Second Office Action dated Feb. 18, 2013 issued in Patent Application No. 200880108295.7.

US Final Office Action dated Jun. 10, 2013 issued in U.S. Appl. No. 12/234,598.

US Office Action dated Aug. 16, 2013, issued in U.S. Appl. No. 11/973,309.

US Final Office Action dated Jul. 9, 2013, issued in U.S. Appl. No. 12/469,573 (F & R).

Chinese Third Office Action dated Jul. 3, 2013 issued in Patent Application No. 200880108295.7.

Chinese First Office Action dated Mar. 20, 2012, issued in Patent Application No. 200880108295.7.

U.S. Appl. No. 11/973,309, Oct. 5, 2007, Shmunis et al.

US Office Action mailed Aug. 5, 2011, issued in U.S. Appl. No. 11/973,309.

US Office Action mailed Dec. 13, 2011, issued in U.S. Appl. No. 12/469,573.

US Final Office Action mailed Jul. 25, 2012, issued in U.S. Appl. No. 11/973,309.

US Office Action mailed Feb. 15, 2012, issued in U.S. Appl. No. 12/234,598.

US Office Action mailed Oct. 11, 2012, issued in U.S. Appl. No. 12/469,573.

US Final Office Action mailed Oct. 18, 2012, issued in U.S. Appl. No. 12/234,598.

(56) References Cited

OTHER PUBLICATIONS

US Office Action mailed Dec. 12, 2012, issued in U.S. Appl. No. 12/234,598.
US Office Action dated Dec. 24, 2013, issued in U.S. Appl. No. 12/234,598.
US Notice of Allowance dated Nov. 20, 2013, issued in U.S. Appl. No. 12/469,573 (F & R).
Chinese Fourth Office Action dated Nov. 4, 2013 issued in Patent Application No. 200880108295.7.

* cited by examiner

300

Note: This information *only* applies if you are using *FaxOut* or Email to Fax. The Call Controller does not have any file format limitations

| File Extension | Application Type | Supported Versions |
|---|---|---|
| pdf | Adobe Acrobat / Adobe Reader | All |
| psd | Adobe PhotoShop | 3.0 and higher |
| doc | Microsoft Word | Windows: 95, 97, 2000, 2003<br>Mac: 4, 5.x, 95, 98 |
| mcw | Microsoft Word for Mac | 4 - 5.1 |
| xls | Microsoft Excel | 5, 95, 97, 2000, 2003 |
| ppt | Microsoft PowerPoint | 4 and higher |
| vsd, vdx | Microsoft Visio | All |
| pub | Microsoft Publisher | 98, 2000, 2003 |
| wps | Microsoft Works | All |
| wri | Microsoft Windows Write | All |
| awd | Microsoft Fax | All |
| tif, tiff, gif, jpg, jpeg, bmp, png, pcx, tga | Generic Graphic Formats | N/A |
| wpd, wp5, wp6 | Corel Word Perfect | 5.x, 6, 7, 8, 9 |
| wpg | Word Perfect Graphics | N/A |
| rtf | Rich Text Format | All |
| txt, log, h, cpp, c, err, hpp | Text Files | N/A |
| wk1, wk3, wk4 | Lotus 1-2-3 | All |
| wq1 | Quattro Pro DOS | All |
| xml | Extensible Markup Language | N/A |
| html, htm | HyperText Markup Language | N/A |
| mht, mhtml | MIME Encapsulation of Aggregate HTML Documents | N/A |
| csv | Comma Separated Values | N/A |
| dxf | AutoCAD (limited support, some objects may not render) | All |
| eps | Encapsulated Postscript | N/A |

Notification Settings
Select your preferred type of notification for each of the following options.
Notification options include text message, voice mail, SMS, email.

Email notifications will be sent

Format of notification email: | HTML |

Text messages will be sent to: | Person@email.com |

Voice Messages
    Email
| Send notification with attachment |
| Delete message when emailed |

Text Messaging | Disabled |

FAX Messages
    Email
| Send notification with attachment |
| Delete message when emailed |

Text Messaging | Disabled |

Incoming Calls
    Email
| Do not send notification |
| Unless the caller leaves a voicemail |
| Unless I answered the call |

Text messaging | Enabled |
| Unless a message was received |
| Unless the call was answered |

Outbound FAX Confirmations
    Email | Send email confirmations |
    Text Messaging | Enabled |

| Submit |

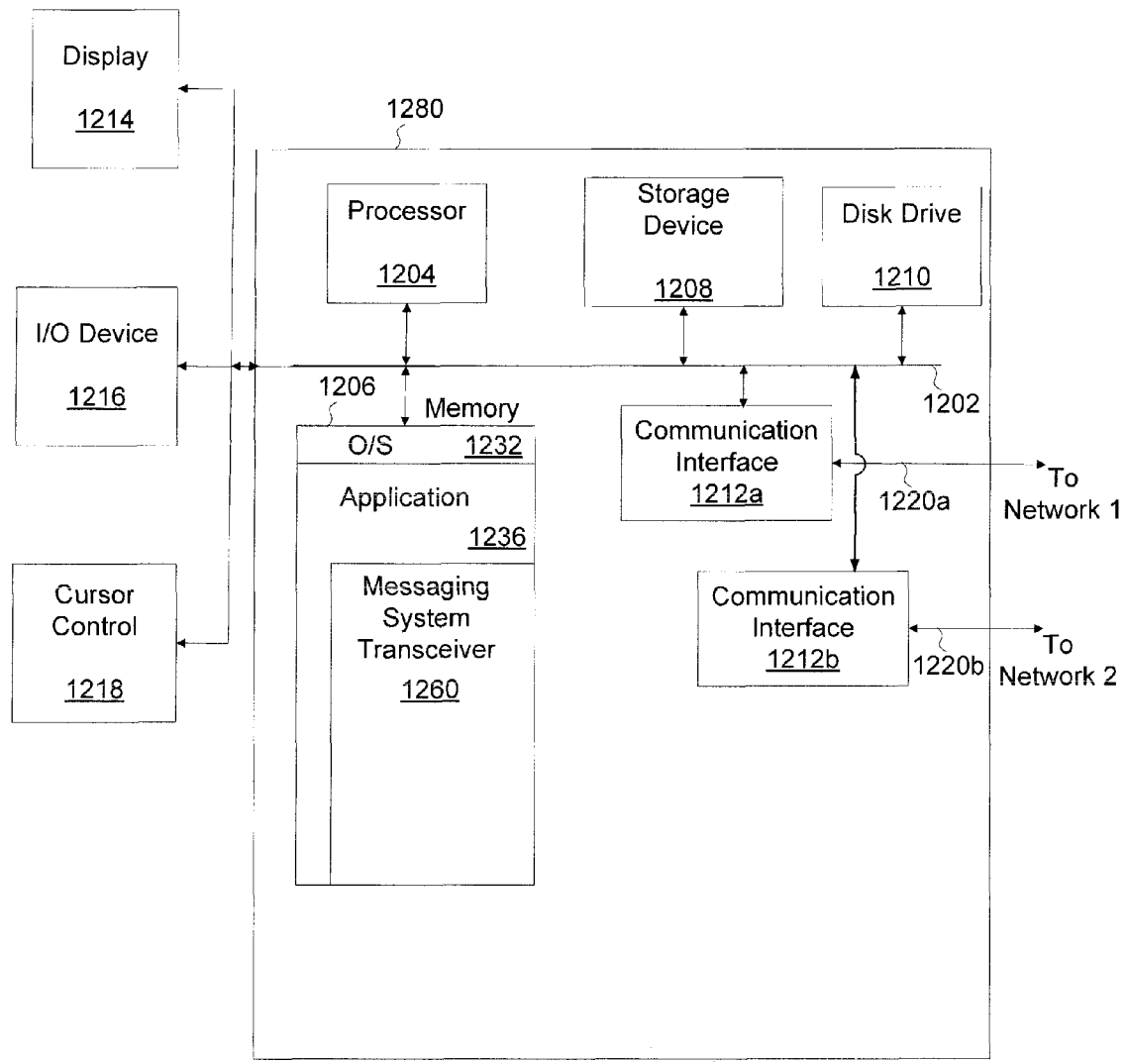
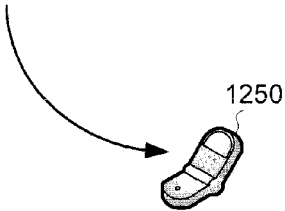
FIG. 12B

US 8,792,118 B2

USER INTERFACES AND METHODS TO PROVISION ELECTRONIC FACSIMILES

CROSS REFERENCE TO RELATED APPLICATIONS

This application claims the benefit U.S. Provisional Application No. 60/995,573, entitled "User Interfaces and Methods to Provision Electronic Facsimiles" and filed on Sep. 26, 2007, which is herein incorporated by reference for all purposes.

FIELD OF THE INVENTION

Embodiments of the invention relate generally to computing devices and systems, as well as software, computer programs, applications, and user interfaces, and more particularly, to provisioning electronic fax messages in a communication network for packetized and/or synchronous communications.

BACKGROUND OF THE INVENTION

Typically, conventional electronic faxes are transmitted without regard to time or day, or availability of fax transmission resources. While traditional techniques for generating electronic faxes are functional, there are certain drawbacks to these techniques. Drawbacks include limited flexibility in generating and transmitting electronic facsimiles that otherwise can might hinder the efficacy of computing systems to deliver electronic messages, such as electronic facsimiles.

It would be desirable to provide computing devices and systems, as well as software, computer programs, applications, and user interfaces that minimize one or more of the drawbacks associated with conventional techniques for generating, transmitting and/or administering electronic faxes.

BRIEF DESCRIPTION OF THE FIGURES

The invention and its various embodiments are more fully appreciated in connection with the following detailed description taken in conjunction with the accompanying drawings, in which:

FIG. 3 is a diagram that provides examples of different application types that the messaging system of FIG. 1A can convert into fax-compatible formats, according to at least one embodiment of the invention;

FIG. 8C is a diagram showing an example of a variety of input fields configured to provide notifications for an electronic message, according to at least one embodiment of the invention;

FIG. 12B illustrates another exemplary computer system suitable for facilitating generation and transmission of electronic messages, such as electronic facsimiles, according to at least one embodiment of the invention.

Like reference numerals refer to corresponding parts throughout the several views of the drawings. Note that most of the reference numerals include one or two left-most digits that generally identify the figure that first introduces that reference number.

DETAILED DESCRIPTION

Figure 1A:
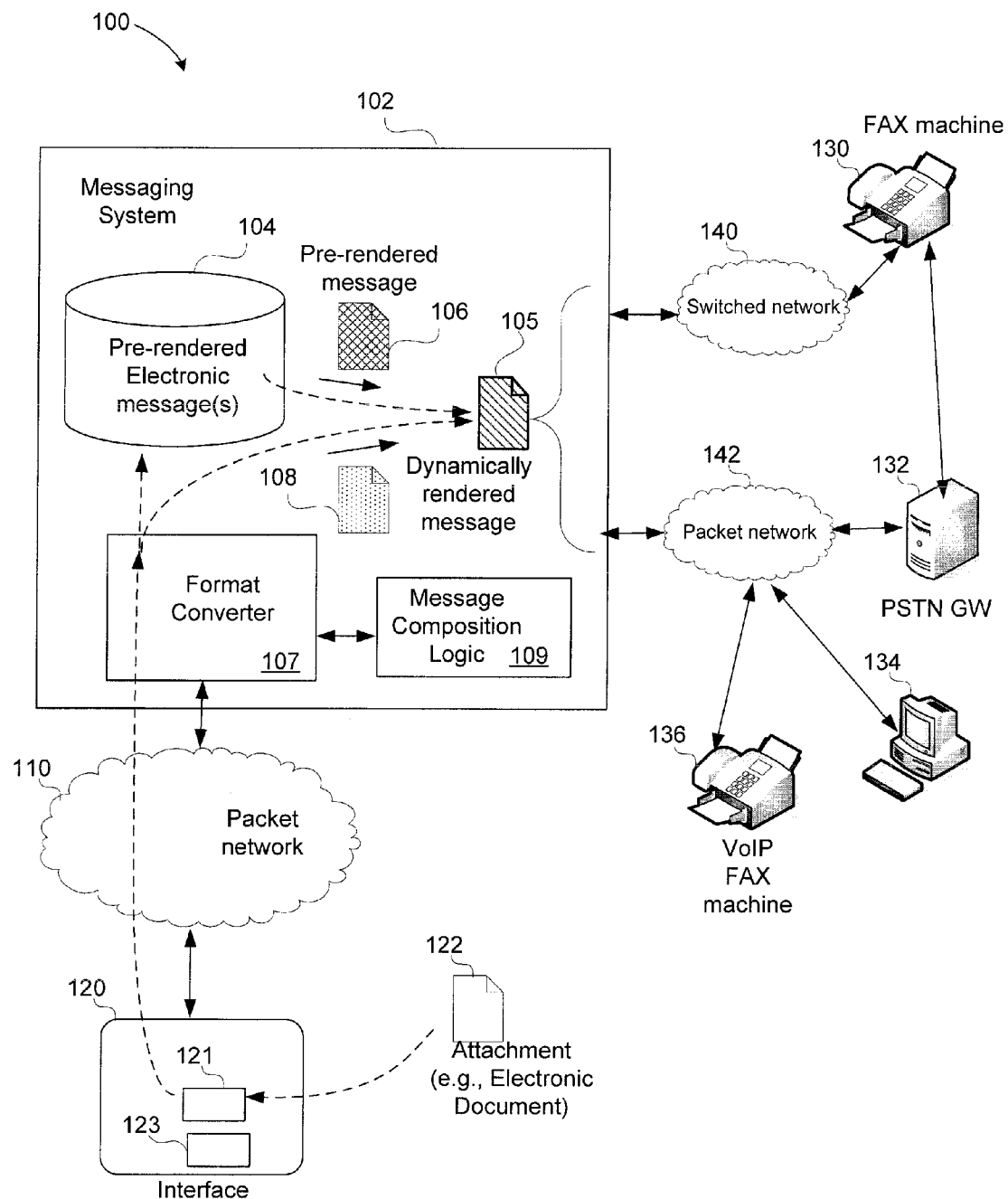
FIG. 1A is a diagram of an interface implementing one or more message input fields to provision electronic messages, such as electronic facsimiles, according to at least one embodiment of the invention.

FIG. 1A is a diagram 100 of an interface implementing one or more message input fields to provision electronic messages, such as electronic facsimiles, according to at least one embodiment of the invention. FIG. 1A shows an interface 120 coupled via, for example, a packet network 110 to a messaging system 102 for provisioning an electronic facsimile 105 to a switched network 140, to another packet network 142, or to any type of other communications network. In various embodiments, messaging system 102 can be configured to send (or receive) an electronic facsimile between any two or more communication devices. Examples of such communication devices include analog group 3 ("T.30") fax endpoints (e.g., fax machine 130), T.38 PSTN fax gateways (e.g., PSTN GW 132), email boxes in an email client application in computing device 134, and any other suitable type of communication device, such as a voice-over-internet-protocol ("VoIP") fax machine 136.

In the context of provisioning an electronic facsimile 105, interface 120 can be configured to implement a message input field 121 to attach an electronic document 122 as part of electronic facsimile 105. Message input field 121 can be configured to use electronic documents, regardless of the file format of electronic document 122, by using interface 120. Interface 120 can be configured to create and send faxes between any repositories over packetized and/or synchronous communication networks. In one example, interface 120 can be presented on a display for a computing device coupled to message composition logic 109, which can be a web server (not shown). As such, message composition logic 109 can include libraries of style sheets and formats, as well as other sample electronic facsimile material, which can include data representing components of an electronic facsimile. Facsimile data representing electronic document 122, a destination number (e.g., fax number), and a cover-page, among other things, can be uploaded (or "pushed") to messaging system 102 via an HTTP connection, for example, through packet network 110. In another example, interface 120 can be presented on a display for a client application, from which the facsimile data can be updated by a differential synchronization server or module (not shown). In still another example, interface 120 can be presented on a display for an email application in which a fax polling server or module (not shown) can periodically poll and pull the facsimile data. Or, the facsimile data can be delivered (e.g., using a protocol, such as SMTP) via a store-and-forward server or module (not shown) using a protocol, such as POP3.

In the example shown, messaging system 102 includes a repository ("pre-rendered electronic message(s)") 104 that stores at least pre-rendered electronic messages (such as electronic facsimiles and/or electronic documents), a format converter 107, and message composition logic 109, any of which can be implemented in one or more servers and/or any number of software modules distributed in a system of one or more servers. Responsive to user input selections entered in relation to a portion 123 of interface 120, message composition logic 109 can be configured to—in whole or in part—perform one or more of the following actions in relation to electronic facsimiles: compose, store, route and/or send faxes. In at least one embodiment, format converter 107 can be configured to convert the format of electronic document 122 into another format that is suitable for transmitting to a specific a communication device, regardless of whether the communicator device is compatible with T.30, T.38, or any other protocols or standards. In a specific embodiment, format converter 107 can format electronic document 122—as an attachment—into, for example, a device independent bitmap format either for storage in repository 104 as a pre-rendered message 106 (or a portion thereof), or for immediate delivery by dynamically rendering electronic document 122 into the device independent bitmap format, in real-time (or substantially in real-time), for sending as a dynamically-rendered message 108 (or portion thereof).

While FIG. 1A shows packet networks 110 and 142, and switched network 140, any communications network can be used. For example, private and/or public internet and switching networks can be used, such as IP networks (including protocols TCP, UDP, HTTP, etc.) and switched networks (including public switched telephone networks ("PSTN") or the like, as well as cellular, short message service ("SMS") and other wireless networks.)

As used herein, the term "electronic facsimile" refers generally, at least in one embodiment, to an electronic message that can be formed to include an electronic document, in compliance with specific protocols, such as those associated with ITU T.30 and T.38, or the like. An electronic facsimile can be formed by generating one or more associations among fax components so that they can be combined to produce an electronic facsimile. Examples of "fax components" include data representing content, such as that in an electronic document, a fax number and time and date stamp, a cover sheet, and the like. In some cases, the data representing a fax component can be affixed as part of the electronic facsimile (e.g., during dynamic rendering), whereas in other cases, the fax components can be separable from the electronic facsimile and combined prior to transmission, or after transmission. For example, an attached electronic document and a cover sheet, as separate fax components, can be pre-rendered either separately to form pre-rendered portions of an electronic facsimile, or in combination to form a single pre-rendered portion of the electronic facsimile. In some embodiments, a time and date stamp can be appended to the pre-rendered portion(s) as pre-rendered message 106 is being transmitted as electronic facsimile 105. When affixed, the fax data can be stored within a common data file as the electronic facsimile, such as a pre-rendered electronic facsimile, whereas separable fax data can be stored as separate files in one or more locations in messaging system 102. As used herein, in some instances, the term "fax data" can be used to describe a fax component. As used herein, the term "electronic document," can refer, at least in one embodiment, to any data file (e.g., other than computer programs or system files) that are intended to be used in their electronic form, without necessarily being printed, whereby computer networks and electronic display technologies can help facilitate their use and distribution. In one embodiment, an electronic document 122 can be included in an electronic message, such as an electronic facsimile. As used herein, the term "panel," at least in one embodiment, can refer to displays, palettes, tabs, windows, screens, portions of an interface, and the like. As used herein, the term "pre-rendered," at least in one embodiment, refers to the formation and/or conversion of one or more fax components into a format compatible for transmission of electronic messages, including electronic facsimiles, via a telecommunication network. Examples of compatible formats include T.30 and T.38 compatible formats, such as TIFF and PDF. Other compatible formats can be used to transmit electronic facsimiles in accordance to various embodiments. As used herein, the term "dynamically rendered" refers generally, at least in one embodiment, to rendering one or more fax components in real-time (or nearly real-time) into a compatible fax format during the transmission and/or receipt of an electronic facsimile.

Figure 1B:
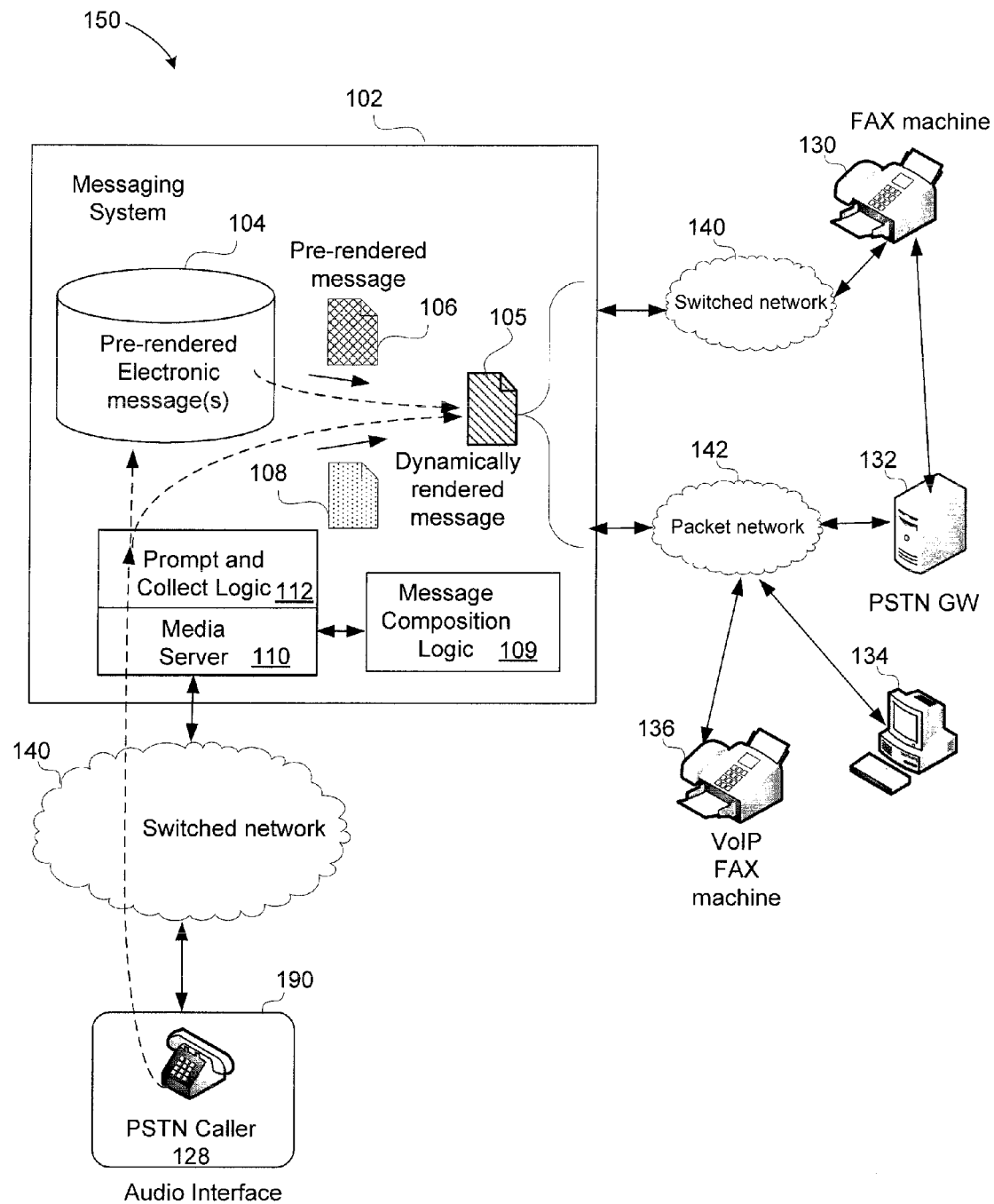
FIG. 1B is a diagram of an interface implementing audio to provision electronic messages, such as electronic facsimiles, according to at least one embodiment of the invention.

FIG. 1B is a diagram 150 of an interface implementing audio to provision electronic messages, such as electronic facsimiles, according to at least one embodiment of the invention. Note that similarly-numbered elements in FIGS. 1A and 1B can share similar structures and/or functions, according to some embodiments. In this example, FIG. 1B shows messaging system 102 including a prompt-and-collect logic 112 and a media server 110 configured to communicate with a PSTN caller device 128. Collectively, prompt-and-collect logic 112 and a media server 110 enable messaging system 102 to accept speech or other audio input for generating electronic messages, such as an electronic facsimile. Prompt-and-collect logic 112 is configured to provide Automated Speech Recognition ("ASR") technology to automate functions associated with a caller using an audio interface 190 at a Public Switched Telephone Network ("PSTN") device 128. As such, prompt-and-collect logic 112 can be configured to detect, interpret and convert a caller's voice response into an alphanumeric selection so as to generate an electronic facsimile 105. While FIG. 1B shows a PSTN caller 128, any other device technology is operable with various embodiments of the invention. In alternative embodiments, audio interface 190 can include a packet network-based phone or communication device (e.g., a VoIP phone, or a softphone and/or computing device), and/or any switched-based phone or communication device.

Figure 2:
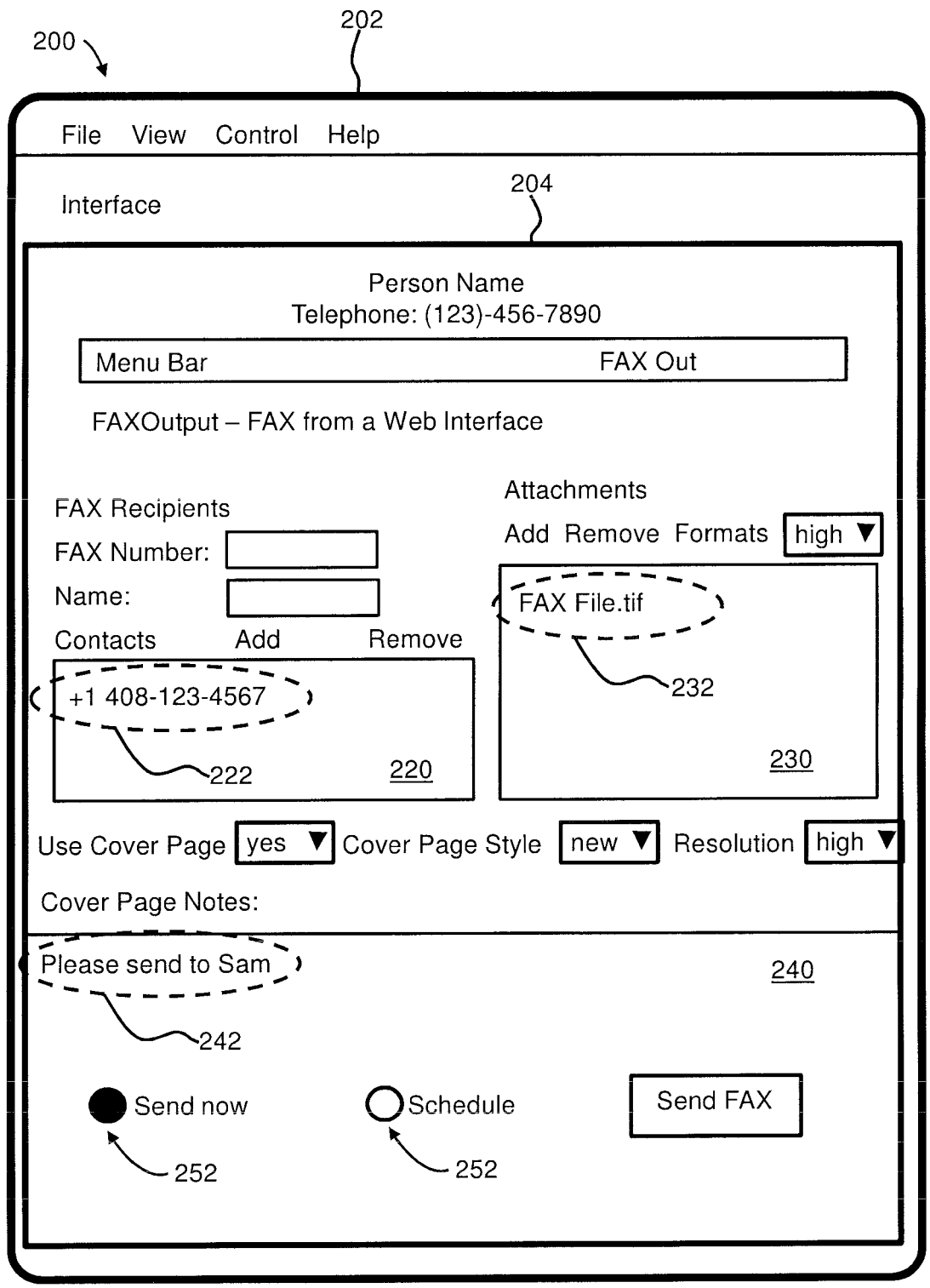
FIG. 2 is a diagram of an interface implementing one or more input fields to provision electronic facsimiles, according to at least one embodiment of the invention.

FIG. 2 is a diagram 200 of an interface implementing one or more input fields to provision electronic facsimiles, according to at least one embodiment of the invention. Here, interface 202 includes a window 204 (or panel) that includes a destination identifier input field 220 to, for example, describe a fax number 222, an attachment input field 230 to, for example, attach or associate an electronic document 232, and cover sheet data input field 240 to associate, for example, text with a cover sheet portion of an electronic facsimile. In this example, interface 202 forms a portion of a web browser. In some cases, an electronic facsimile can be addressed to one or more outbound telephone numbers, such as 4085551212@rcfax.com. Outbound electronic facsimile requests can arrive into messaging system 102 (FIG. 1A) via an HTTP (or HTTPS) connection from interface 202. In one embodiment, interface 202 can accept an input 252 to send the electronic facsimile immediately (or substantially so), and can accept an input 254 to schedule a delivery. In one embodiment, selections of input 254 and input 252 can cause messaging system 102 to generate a pre-rendered message (e.g., as an electronic facsimile) for storage in repository 104, and a dynamically-rendered message (e.g., as an electronic facsimile), respectively. In other embodiments, selection of either input 252 or input 254 does not invoke generation of either a pre-rendered message or a dynamically-rendered message.

FIG. 3 is a diagram 300 that provides examples of different application types 302 that the messaging system of FIG. 1A can convert into fax-compatible formats, according to at least one embodiment of the invention. For example, electronic document 122 can be formatted in any of the application types 302, which can be converted to fax-compatible formats for use by fax machine 130, and the like.

Figure 4:
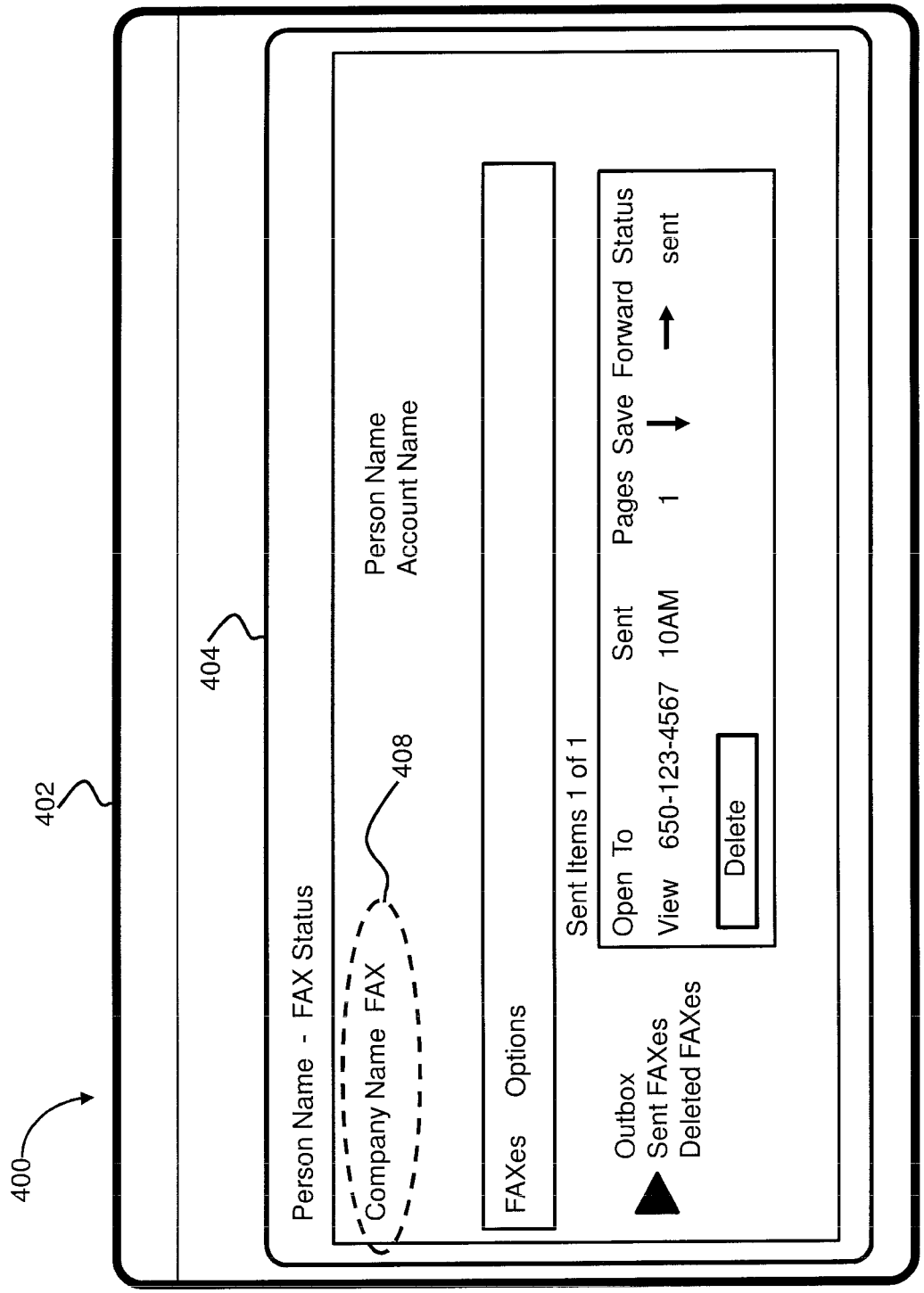
FIG. 4 is a diagram that provides an example of an interface presenting in a proprietary panel, according to at least one embodiment of the invention.
Figure 5A:
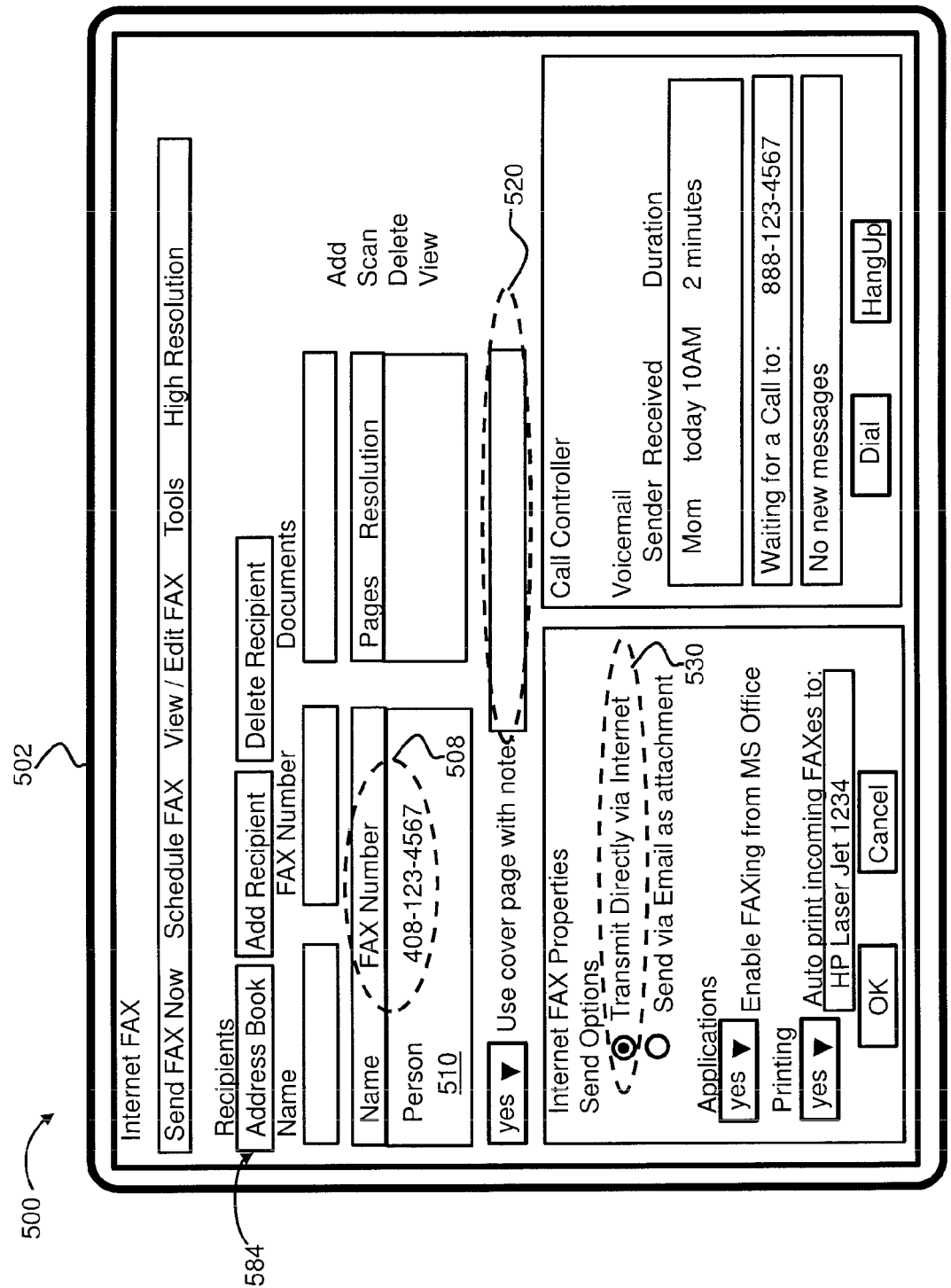
FIGS. 5A to 5C are diagrams showing examples of interfaces that can be implemented in association with a computing device application, according to various embodiments of the invention.

FIG. 4 is a diagram 400 that provides an example of an interface presenting a proprietary panel, according to at least one embodiment of the invention. Here, interface 402 includes a branded panel 404 for provisioning and administering electronic facsimiles. As shown, branded panel 404 indicates that electronic facsimile input data can be used to compose an electronic facsimile, for example, via a service provider named as "NewCo" 408. For example, branded panel 404 can be implemented in connection with the services of Skype, Inc., or the like. Messaging system 102 of FIG. 1A, therefore, can facilitate fax hosting by or in connection with a service provider, and can deliver electronic facsimiles as a retail service, or as a custom-branded and packaged whole service. In one example, messaging system 102 can maintain a repository of scheduled and sent faxes (e.g., in a database not shown), and a user may access this repository via a window browser display, such as interface 402. A user may select one or more electronic facsimiles with which to transmit via interface 402, which makes electronic facsimiles accessible to the user to delete, reschedule, resend and/or forward any electronic facsimile or message. In some embodiments, messaging system 102 can be outwardly branded and integrated as a wholesale service into a third party's customer-facing (e.g., retail) services. In some embodiments, a computing device (not shown) can implement interface 402 to compose a retail fax-formatted message, and messaging system 102 can manage and dispatch the resultant electronic facsimile. In one embodiment, a vendor can leverage a custom client fax interface; such as an XML WSDL or a proprietary document development and transmittal protocol FIG. 5A is a diagram 500 showing an example of an interface that can be implemented in association with a computing device application, according to at least one embodiment of the invention. Here, interface 502 includes a panel 504 for provisioning and administering electronic facsimiles, including composing and sending. In one embodiment, the computer application that implements panel 504 is a "softphone," which includes executable instructions for making telephone calls over a network using a general purpose computer. As shown, panel 504 includes an address book input 584 for selecting one or more fax recipients, the names of which can be displayed in field 510 with a fax number 508. A field 520 is provided to enter cover page text. Further, panel 504 includes a send option 530 for transmitting an electronic facsimile over the Internet.

Figure 5B:
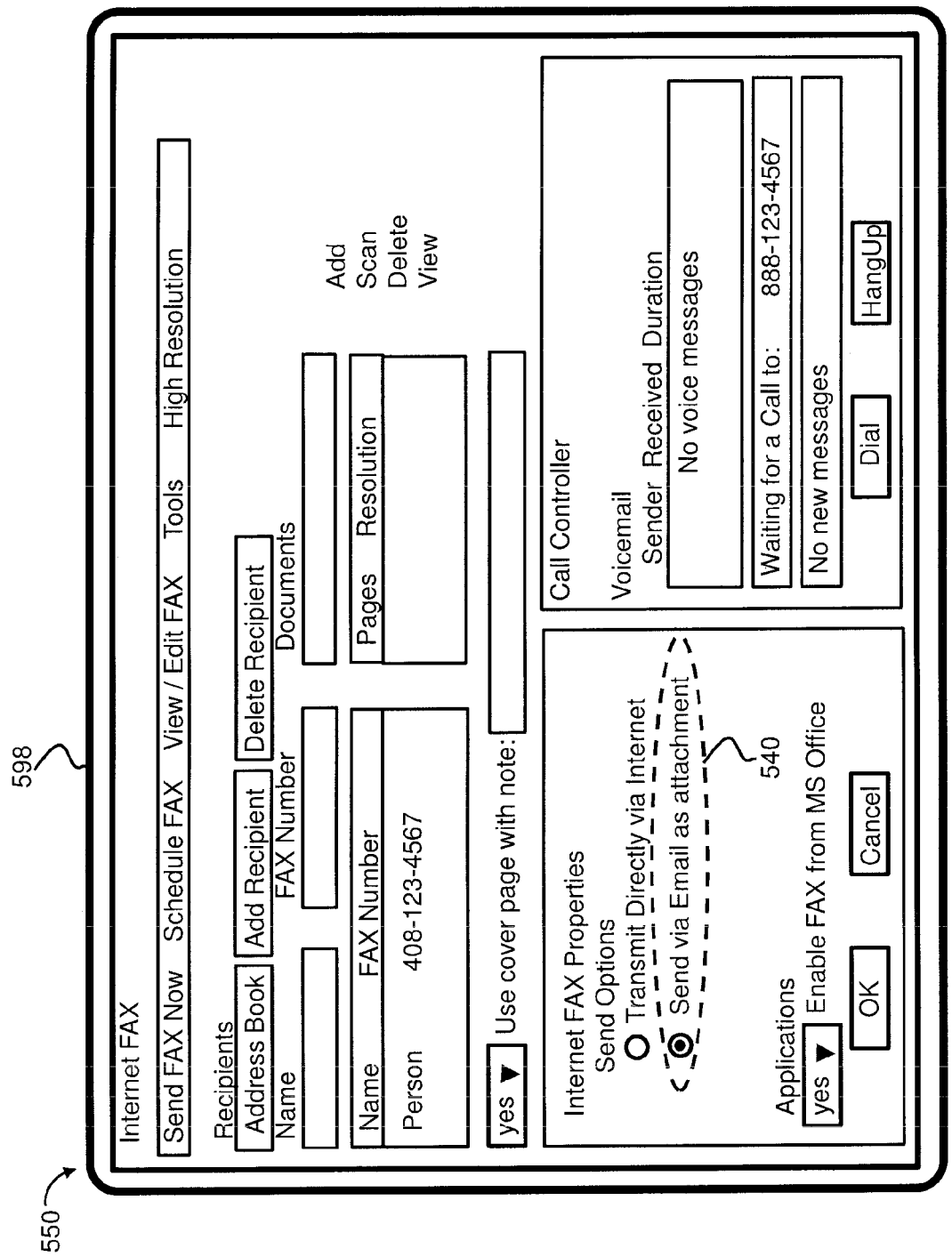

FIG. 5B is a diagram 550 showing an example of the panel of FIG. 5A for transmitting an electronic facsimile via an email application, according to at least one embodiment of the invention. Here, a panel 598 is configured to transmit an electronic facsimile using an email application, such as Microsoft, Inc.'s Outlook™ subsequent to selecting input 540. With panel 598—which also can be an interface, a user can craft and send electronic messages and/or facsimiles via HTTP over the Internet, or via SMTP. When sending electronic messages and/or facsimiles via a direct connection via the Internet, a softphone can deliver a pre-rendered file via an HTTP client to, for example, a synchronization server (not shown), which can be configured to listen for (i.e., detect) data via an HTTP server (not shown).

Figure 5C:
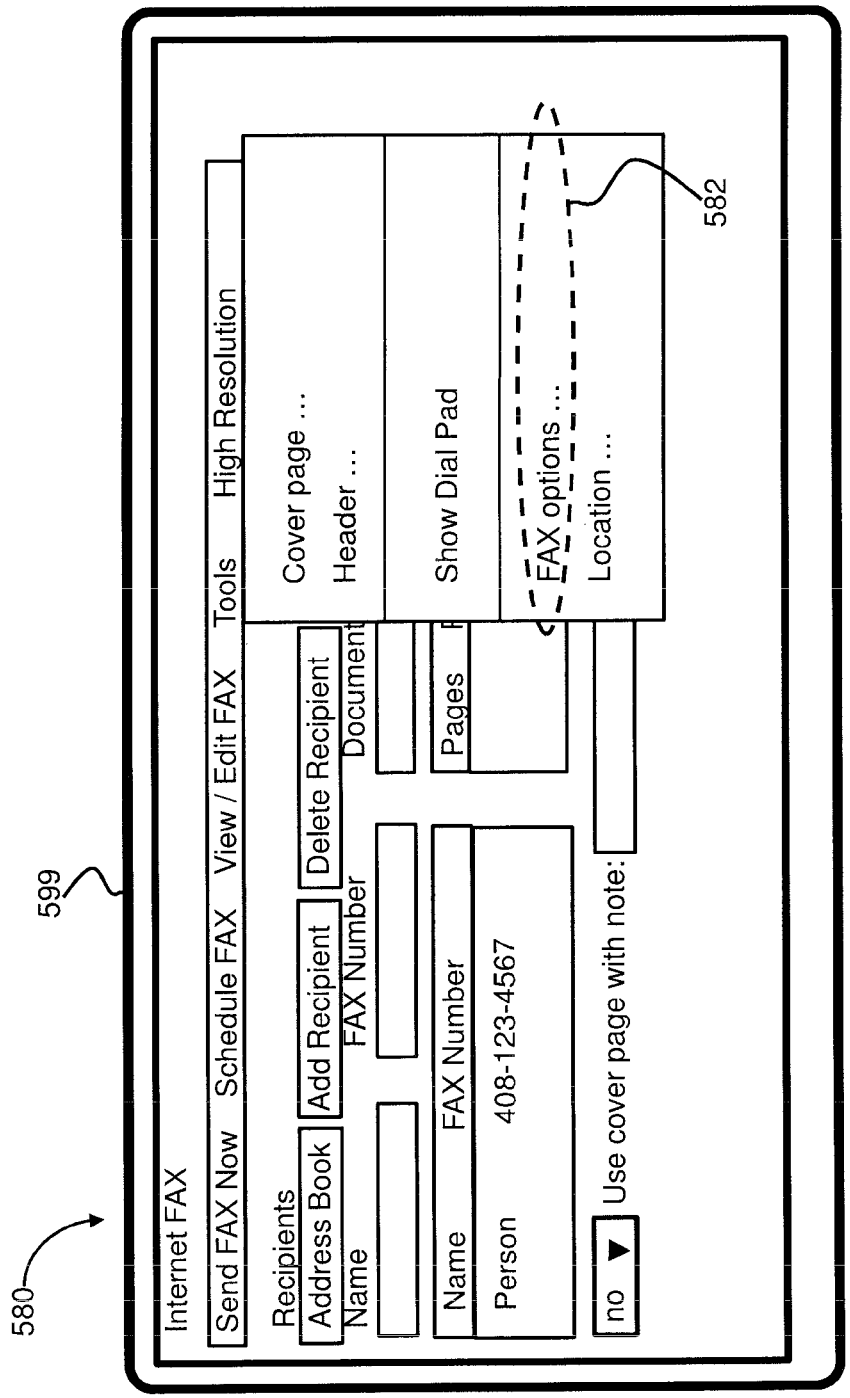

FIG. 5C is a diagram 580 showing an example of a panel used for instantiating panels in FIGS. 5A and 5B, according to at least one embodiment of the invention. Here, a panel 599 includes a pull-down menu for activating an input 582, which, in response, can present the panels shown in FIGS. 5A and 5B.

Figure 6:
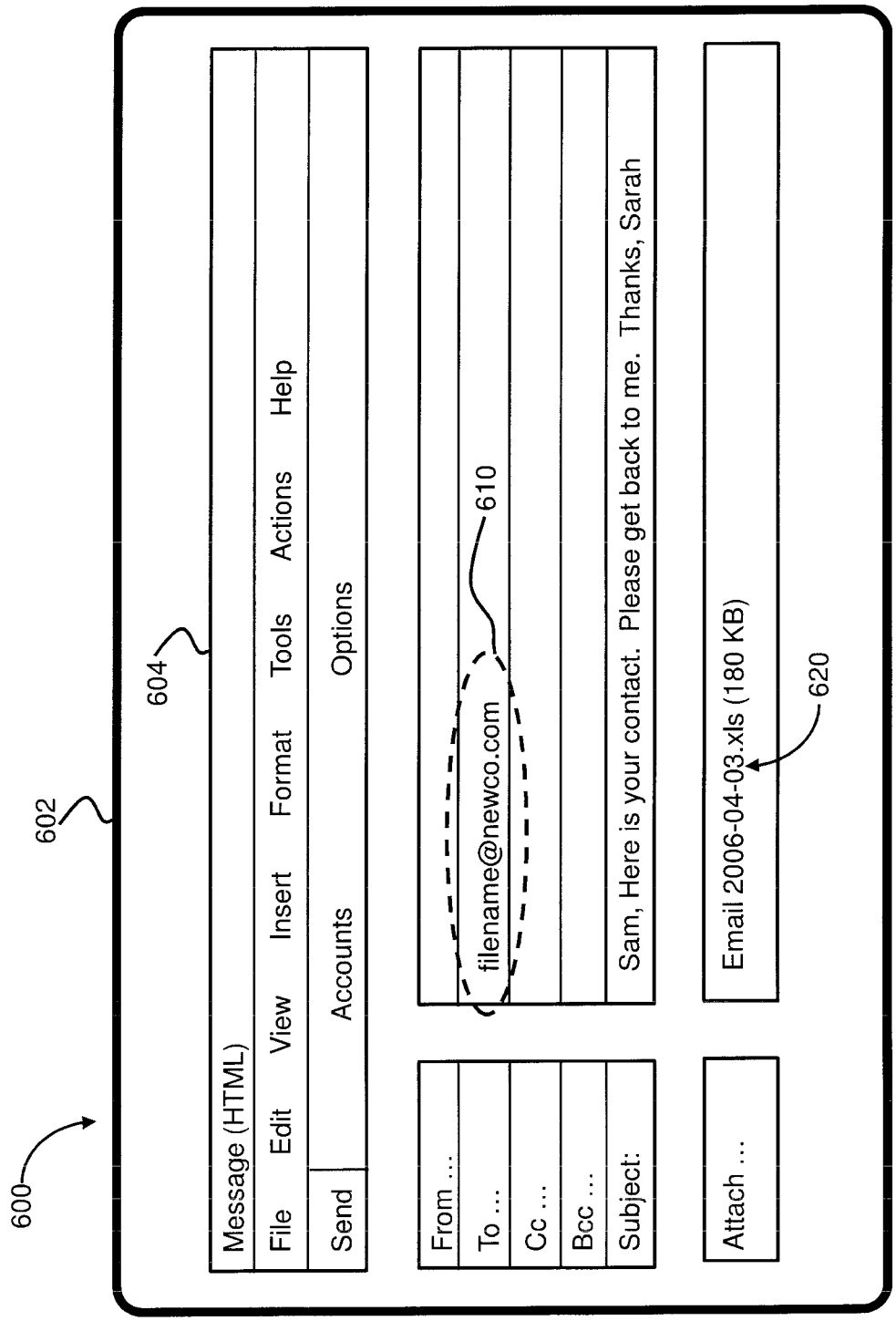
FIG. 6 is a diagram showing an example of a panel configured to compose and/or transmit an electronic facsimile using an email application, according to at least one embodiment of the invention.

FIG. 6 is a diagram 600 showing an example of a panel configured to compose and/or transmit an electronic facsimile using an email application, according to at least one embodiment of the invention. Here, an interface 602 includes a panel 604 having a field 610 for entering a destination (e.g., a fax number), and a field 620 for including or associating an electronic document, such as an Excel™ spreadsheet document. Messaging system 102 (FIG. 1A), at least in some embodiments, can leverage known email services to send electronic facsimiles, which can be delivered as an email that includes data representing a cover page, content pages (e.g., of an electronic document) and (optionally pre-processed) electronic facsimile and/or document files. In one instance, an end-user can send an electronic facsimile addressed to one or more known email addresses for delivery to multiple fax recipients. Recipient addressing can be embedded within a softphone or within an email, similar to addressing emails to multiple recipients. The email subject line can be used for the fax cover page. Email attachments can include electronic documents to be uploaded and converted to a fax format, according to one embodiment. In an embodiment, a fax polling server (not shown) can periodically poll other servers (not shown) in messaging system 102 for emails that are to be sent as an electronic facsimile.

Figure 7:
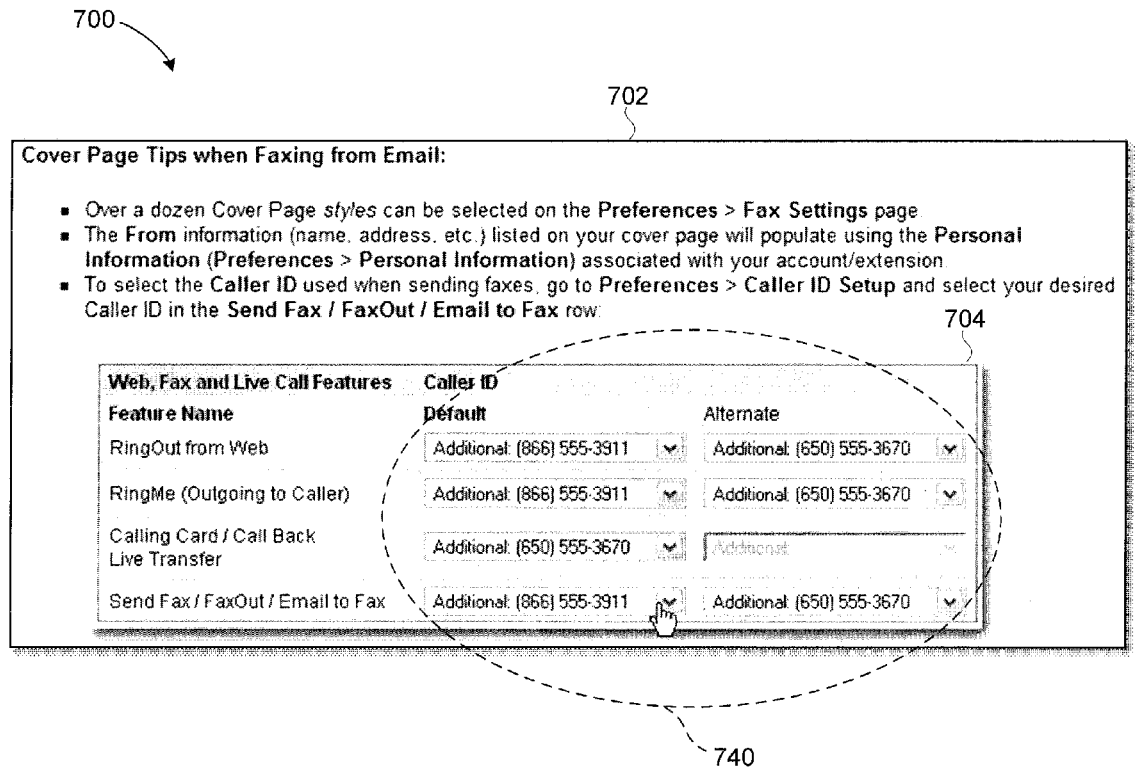
FIG. 7 is a diagram showing an example of a panel configured to modify the actions of a messaging system, according to at least one embodiment of the invention.

FIG. 7 is a diagram 700 showing an example of a panel configured to modify the actions of a messaging system, according to at least one embodiment of the invention. Here, a panel 704 in an interface 702 can be configured to modify the manner in which electronic facsimiles are composed and sent. For example, panel 704 can include fields 740 for providing various caller IDs for different functions of messaging system 102. Panel 704 can be formed to facilitate client-based or web-hosted assistance, including wizards for composing and sending a fax and help include text and multi-media presentations.

Figure 8A:
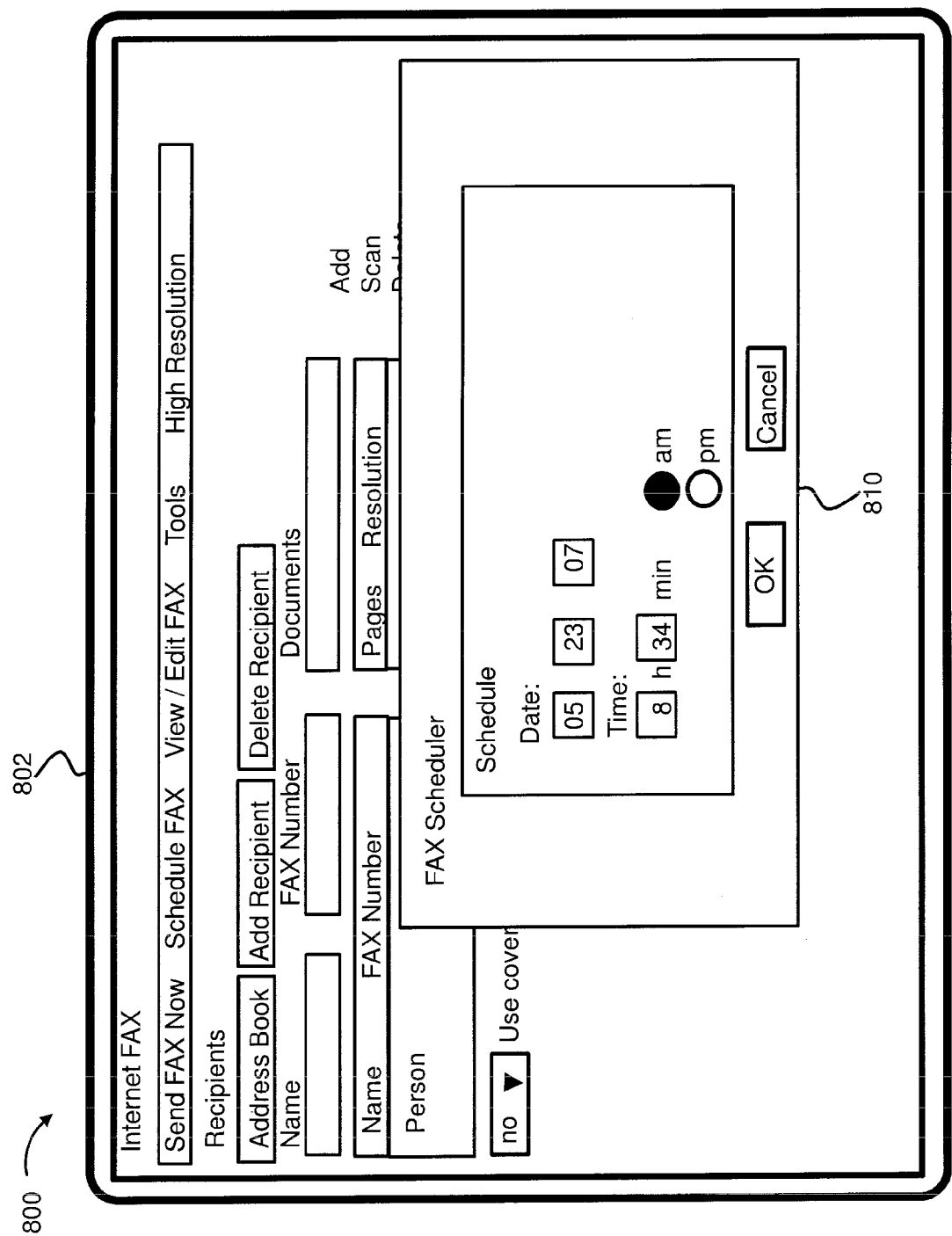
FIG. 8A is a diagram showing an example of a panel configured to schedule delivery of an electronic message via a messaging system, according to at least one embodiment of the invention.

FIG. 8A is a diagram 800 showing an example of a panel configured to schedule delivery of an electronic message via a messaging system, according to at least one embodiment of the invention. Here, a panel 810 in an interface 802 can be configured to transmit an electronic facsimile at any time and at any date. Scheduling can allow the user to plan fax transmission of the electronic facsimile according to a least-cost route, time of day/week etc. to transmit the fax.

Figure 8B:
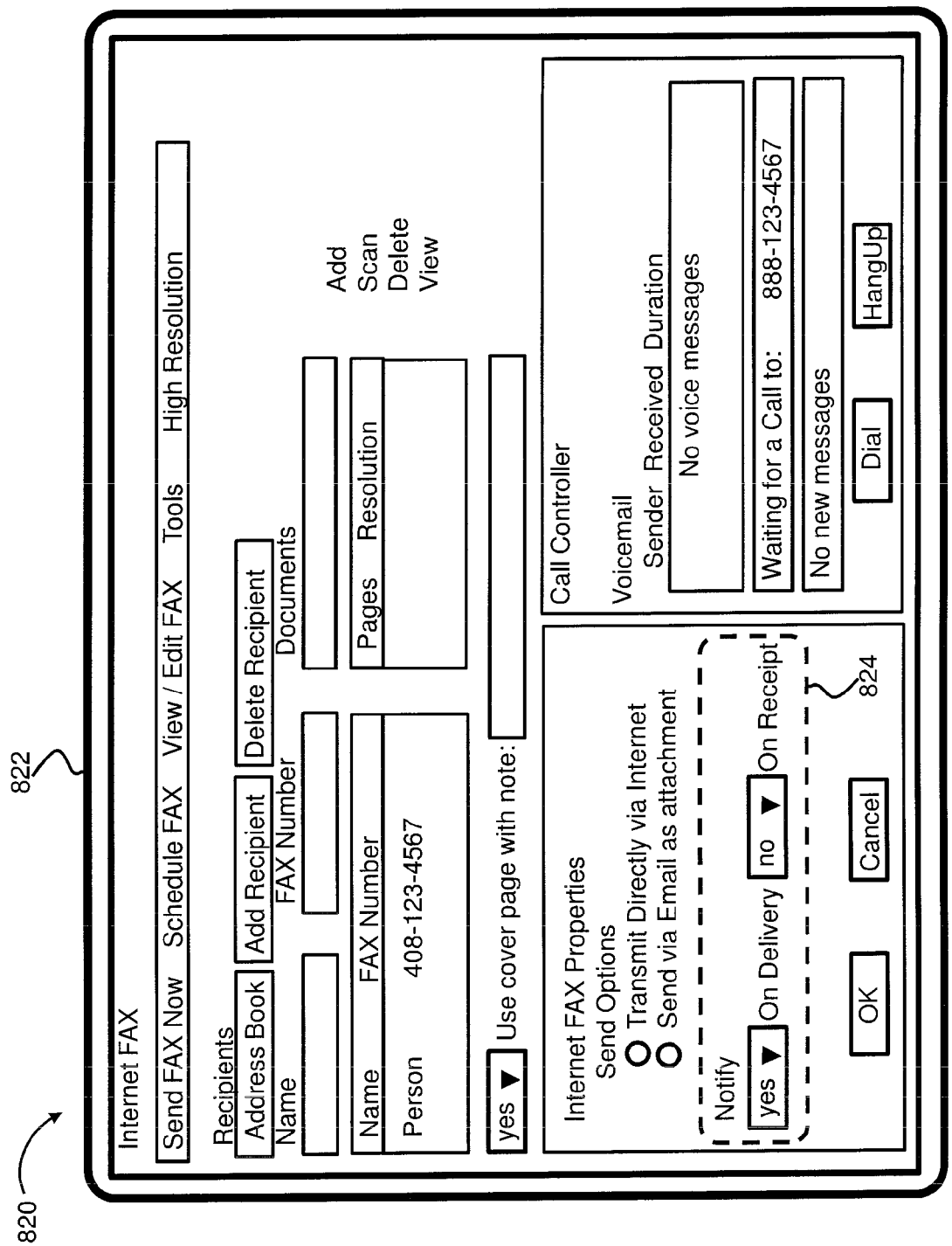
FIG. 8B is a diagram showing an example of a panel configured to schedule delivery of an electronic message via a messaging system, according to at least one embodiment of the invention.

FIG. 8B is a diagram 820 showing an example of a panel configured to schedule delivery of an electronic message via a messaging system, according to at least one embodiment of the invention. Here, a panel 822 in an interface can be configured to generate a notification either on delivery or on receipt, or both, of an electronic message. As shown, panel 822 includes input fields 824 for selecting a notification.

FIG. 8C is a diagram 850 showing an example of a variety of input fields configured to provide notifications for an electronic message, according to at least one embodiment of the invention. Here, a variety of input fields 854 in a panel 852 can be used to configure notification settings for each type of communication, such as email, fax, and incoming and outgoing phone calls. In view of the foregoing, message system 102 (FIG. 1A) can be referred to as a "unified messaging system."

Figure 9:
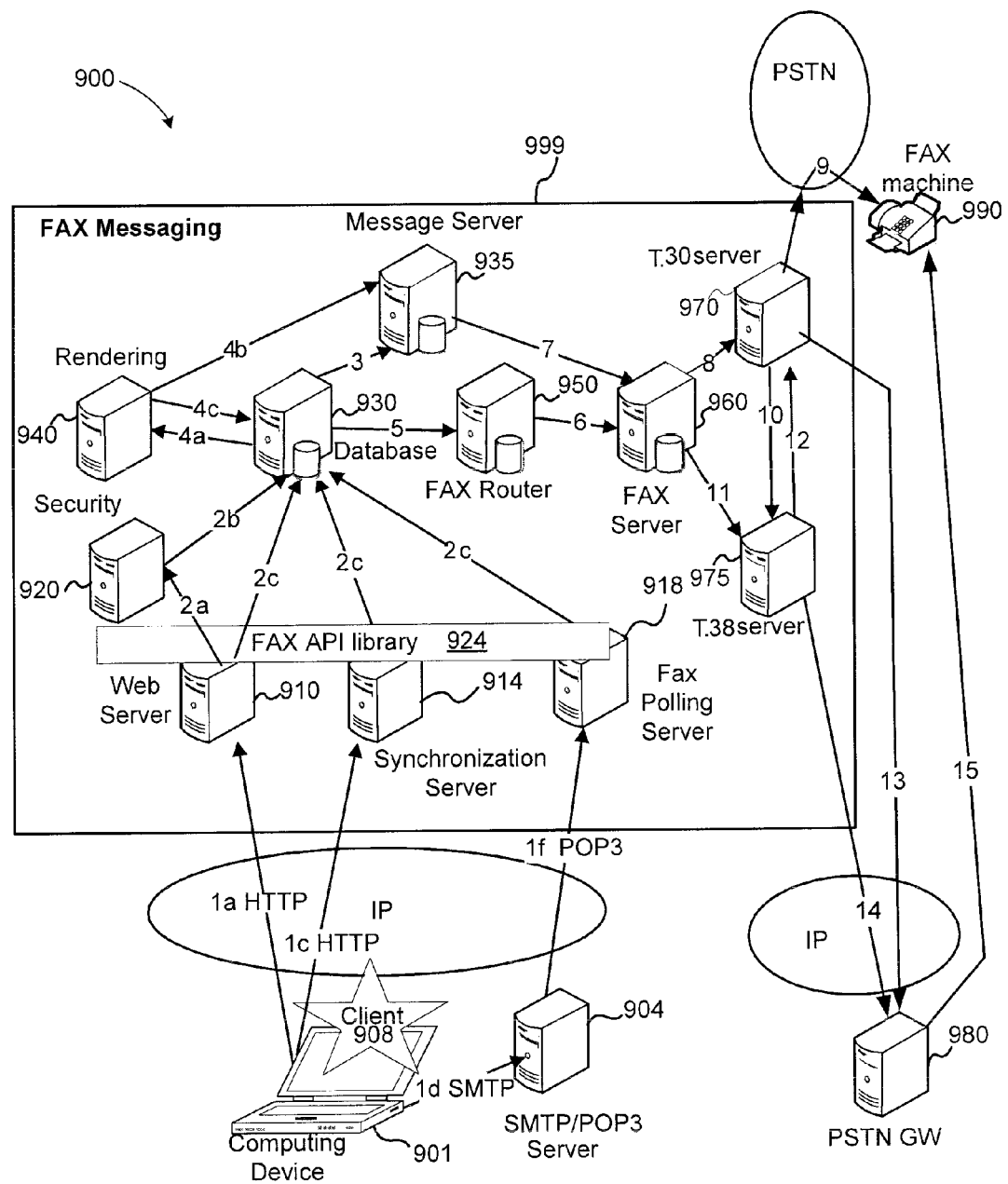
FIG. 9 is a diagram showing an example of a messaging system, according to at least one embodiment of the invention.

FIG. 9 is a diagram showing an example of a messaging system, according to at least one embodiment of the invention. Here, messaging system 999 includes a web server 910, a synchronization server 914, and a fax polling server 918, each of which can individually or collectively implement or access a Fax API library 924. Messaging system 999 further includes a security server 920, which is optional, a rendering server 940, a database 930, a message server 935, a fax router 950, a fax server 960, a T.30 server 970, and a T.38 server 975. As shown, messaging system 999 can be coupled via a network (e.g., an IP network) to a computing device 901 configured to operate as a client 908 to form web-based electronic facsimiles. Computing device 901 can include a softphone application or another client application program to generate electronic facsimiles, and/or an email application to form email-based electronic facsimiles. Messaging system 999 can use an SMTP/POP3 server 904 to facilitate the provisioning of email-based electronic facsimiles. Further, messaging system 999 is shown coupled via a PSTN network 9 to a fax machine 990, as well as via, for example, an IP network to a PSTN gateway ("GW") 980.

In operation, facsimile transmission requests arrive from any of a multiple interfaces to one of three functional servers: Web (910), Synchronization (914) and Fax Polling (918) servers, according to one embodiment. Note that the capabilities of these three servers can be hosted in an enterprise or a datacenter. These servers can be configured to upload requests for electronic facsimiles to the hosted Database (930) via a database or any other interface (2c). As an implementation example, the Web (910), Synchronization (914) and Fax Polling (918) servers can include an application library API 924. Each of Web (910), Synchronization (914) and Fax Polling (918) servers can be configured to invoke the library 924 in relation to an API. For example, the API can be configured to invoke a client interface to transmit a fax record to the Database (930).

Figure 10:
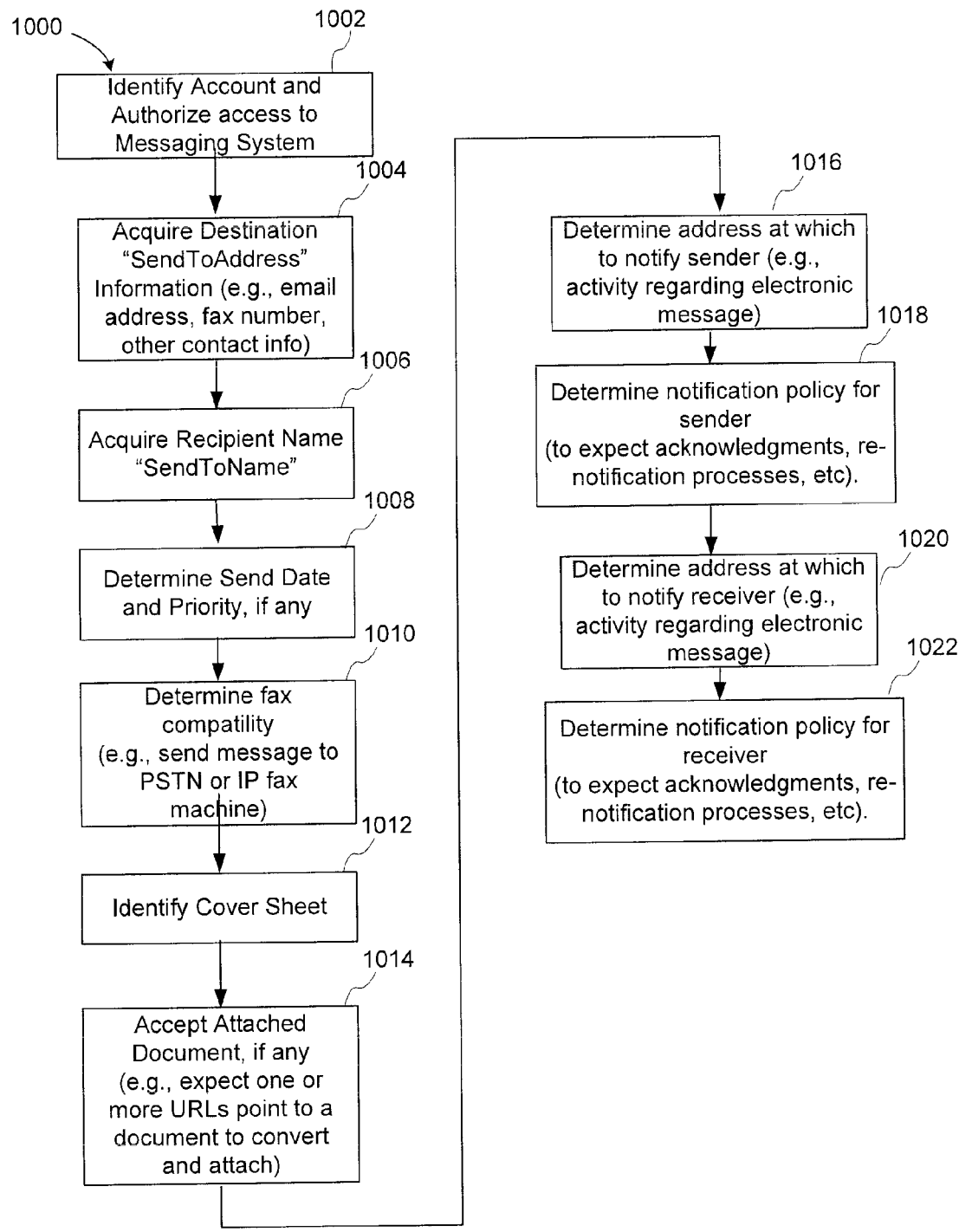
FIG. 10 is a diagram showing an example of processes performed by or in connection with API library of FIG. 9, according to at least one embodiment of the invention.

FIG. 10 is a diagram showing an example of processes performed by or in connection with API library 924, according to at least one embodiment of the invention. Flow 1000 includes establishing access to generate an electronic message (e.g., electronic facsimile) 1002 by, for example, confirming authorization to do so. At 1004, a destination identifier, such as a fax number or email address, for the electronic message is acquired as a fax component. A recipient identifier, such as a name, can be acquired at 1006, with the sending date and time, as well as priority, if any, being determined at 1008 as a fax component. At 1010, a determination is made to format the fax in a fax-compatible format suitable for transmission via a PSTN or an IP network. At 1012, a fax coversheet is identified and retrieved as a fax component. At 1014, an electronic document can be identified optionally as an attachment (e.g., one or more URLs can point to a document for conversion into a fax-compatible format). From 1016 to 1022, various optional determinations can be made to implement notifications regarding the delivery of an electronic facsimile. For example, at 1016, a notification policy for the sender can be determined (e.g., regarding how notifications are to be delivered, the triggering events upon which they are delivered, such as the receipt of fax confirmation message of successful transmission, etc.). At 1016, an address (e.g., email address or phone number) at which to notify sender is determined. At 1018, a notification policy for the sender can be determined (e.g., regarding how notifications are to be delivered, the triggering events upon which they are delivered, such as the receipt of fax confirmation message of successful transmission, etc.). At 1020 and at 1022, respectively, an address (e.g., an email address or phone number) at which to notify the receiver is determined, and a notification policy for the receiver can be determined (e.g., regarding how notifications are to be delivered to receiver, etc.). In other various embodiments, API library 924 of FIG. 9 and the processes elements of FIG. 10 can include fewer subprocesses than shown, or can include additional subprocesses not shown. API library 924 (or portions thereof) can be distributed throughout messaging system 999, or external thereto.

Referring back FIG. 9, Database (930) server can operate to invoke stored procedures to record the fax records in a Database schema compatible with Database (930), or can send the fax material to either a Rendering server (940) or to a Message server (935), or both. The Database (930) can reference the corresponding fax content files in Message Server (935) via a URL or a mounted drive (3), such as e:\fax_folder\1934567890.fax. Thus, a fax policy record can be stored in a Database server (930) schema, and this fax policy record can specify the fax content file on a Message server (935). Then, rendering server (940) can pre-format the fax content and update (4b) the content on the Message server (935) or on the Database server (930). A fax content file can include data representing either an electronic document or an electronic facsimile, or both, or any portions thereof. In instances when a fax file (e.g., an electronic facsimile) is not pre-formatted (e.g., not pre-rendered), then a Fax Router (950) or a Fax server (960) can format (e.g., dynamically render) the electronic facsimile while transferring (6, 7) or while transmitting (8, 11) the fax.

At a scheduled or at a first available time, the Database server (930) can request that Fax Router (950) select a preferred fax delivery route and corresponding fax delivery resources, such as a Fax server (960). Using a protocol, the Fax Router (950) sends a multicast or a broadcast request (6) to a network and selects the first responding Fax Router (950) resource to reply to the request. The Fax Router (950) can forward the fax content to the Fax server (960) or can send the Fax server (960) pointers to stored fax material (e.g., electronic facsimile). The Fax server (960) can request or can pull the fax material from a Database (930) or from a Message server (935) to access the fax delivery route, priority and the fax document material.

The Fax server (960) then can initiate a call to a switching service (such as the telephone line T.30 server 970 via 8) or to a network service (such as the Internet T.38 server 970 via 11). In one embodiment, the T.38 server (970) requests (12) a telephone line T.30 server (970) to initiate a telephone call while the T.38 server (970) negotiates a fax transfer rate and sends the fax material.

The Fax user interface can be displayed on the Subscriber's computing device (901) using a web server (910), or a computing device including client application (908). The fax number, and any cover-page data and electronic documents to be faxed can be composed on the computing device (901), on the web server (910), or can be selected from libraries of style sheets (e.g., data describing how to format the presentation of text and graphics) and other sample fax material.

When composed, the fax material (e.g., electronic facsimile) can be uploaded (pushed) to FAX Messaging system 999 via HTTP (1a). Or, the data representing or association with an electronic facsimile can be updated by a synchronization server (914). In one embodiment, synchronization server (914) is a differential synchronization server, which can be configured to perform differential synchronization techniques to keep two or more copies of the same electronic message, including an electronic facsimile, synchronized with each other in real-time (or substantially in real-time). As such, differential synchronization server (914) can be configured to check against a record residing at client 908 for any revised content relating to a record (not shown) for the same electronic message (or electronic facsimile) stored in message system 999, such as in, for example, database 930. In one instance, data for an electronic facsimile can be periodically polled and pulled by a Fax Polling server (918), or can be delivered (using a common protocol SMTP 1d) via a store-and-forward server (SMTP or POP3 server 904) using a specialized protocol (POP3 1f).

Prior to sending a fax, either computing device 901 or a hosted server, such as any of servers 910, 914, or 918, can contact a Security server 920 with a secure protocol 2a. The Security server 920 can locally look up and validate the Subscriber FAX account permissions, or can access 2b an external database to do so. The Security server 920 can ask for subscriber credentials and can return an authorization ticket with, for example, a secure Fax SubscriberID and expiration date-time stamp. Therefore, Fax permissions can be customized for a subscriber (e.g., a user) for durations depending upon various conditions; such as account balance, day of week, network usage.

In one embodiment, an authorization ticket can be returned to the originating fax server (910, 914, and 918). Upon receipt of the ticket, the fax server (910, 914, and 918) validates the SubscriberID against the encrypted ticket. If the validation succeeds, then any server (910, 914, and 918) can check 2c if the Subscriber's account is in a Fax Messaging Database 930, and if not, then the Subscriber information can be added thereto to form a new Subscriber account record in the Database 930. Then, any of servers (910, 914, and 918) can send the fax data to the Database 930. Fax delivery information can be stored in the Database 930 and any fax document can be stored in a Message Server 935. Otherwise the fax data and delivery information can be stored in a Message Server 935 or in a Fax Router 950.

Data representing fax content can include a cover-page, content pages and/or attached documents, such as an electronic document. Attached electronic documents can be in any of a various recognized formats; such as shown in FIG. 3. Attached documents can be pre-rendered into common fax format by a Rendering server 940 which places the documents in, for example, a device independent bitmap format and stores the documents in the a Database 930, or in an external Message server 935. Otherwise, the documents can be dynamically rendered when transmitting from a Fax server 960, a switched network server (for example a T.30 server 970), or at a network packet server (for example a T.38 server 975).

Figure 11A:
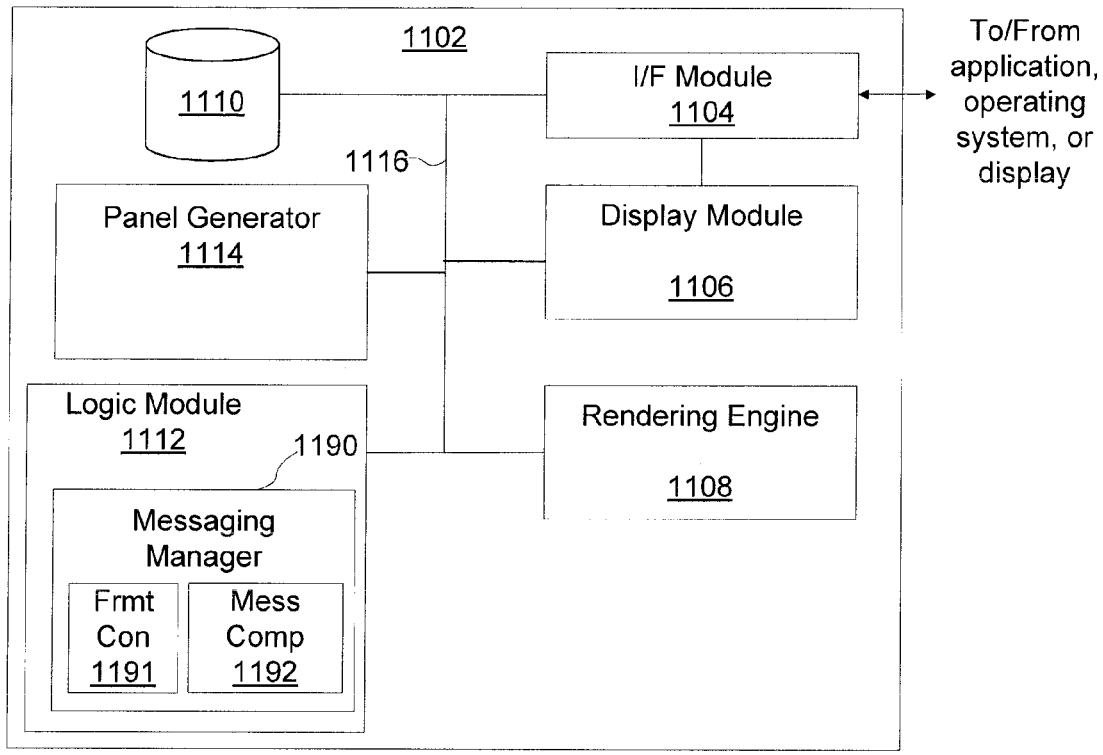
FIG. 11A illustrates an example of a panel presentation application for generating and transmitting electronic messages, according to various embodiments of the invention.

FIG. 11A illustrates an example of a panel presentation application for generating and transmitting electronic messages, according to various embodiments of the invention. In at least one embodiment, an interface to provide for the generation and transmission of electronic messages can be implemented in a panel, such as a single panel, in one or more portions thereof, or in separate panels. Application 1102 can be a softphone application (e.g., an application configured to adapt a computing device to perform known telephony functions), or an application disposed on a server, such as web server 910 (FIG. 9), to carry out the electronic message generation and transmission functionalities described herein. Here, application 1102 includes interface ("I/F") module 1104, display module 1106, rendering engine 1108, repository 1110, logic module 1112, panel generator 1114, and data bus 1116. In some examples, the number and type of elements shown and described may be varied and are not limited to the descriptions provided. In some examples, the above-described elements can be implemented as part, component, or module of application 1102. As an example, application 1102 can be implemented to include either commands for establishing rules to effect the generation and transmission of electronic messages among endpoints, the commands imparting functionalities as described herein. Logic module 1112 can be implemented as software, hardware, circuitry, or a combination thereof to implement control logic for the described techniques for panel presentation. As used herein, the term "panel," at least in one embodiment, can refer to displays, palettes, tabs, windows, screens, portions of an interface, and the like.

In some examples, logic module 1112 can be configured to control panel generator 1114 to interact with a messaging system configured to present options to, for example, provide for customizable generation and transmission of electronic messages, such as electronic facsimiles. Rendering engine 1108 can be configured to operate as a layout engine for web pages, for example, to manipulate both content (e.g., as expressed in or including HTML, XML, image files, etc.) and formatting information (e.g., as expressed in or including CSS, XSL, etc.) for rendering the data or information as one or more panels on interfaces described herein. Interface module 1104 can exchange panel presentation data, including content data, image data, audio data, as well as other data, between application 1102 and another application (e.g., a host, client, web services-based, distributed (i.e., enterprise), application programming interface ("API"), operating system, program, procedure or others) that can use data and information generated from panel generator 1114 to render presented panels on a display screen. In other examples, the above-described techniques and elements can be varied in design, implementation, and function and are not limited to the descriptions provided. In one embodiment, logic module 1112 can include messaging manager module 1190 that is configured to include structure and/or functionality similar to one or more previously-described messaging systems and/or components thereof. For example, logic module 1112 can also include a format converter ("Frmt Con") module 1191 and a message composition logic ("Mess Comp") module 1192, both of which can be configured to be accessed via an interface. For example, format converter module 1191 can be accessed to format electronic documents and fax components into fax-compatible formats, and the like, and message composition logic module 1192 can be accessed to create, modify and/or route electronic facsimiles.

Figure 11B:
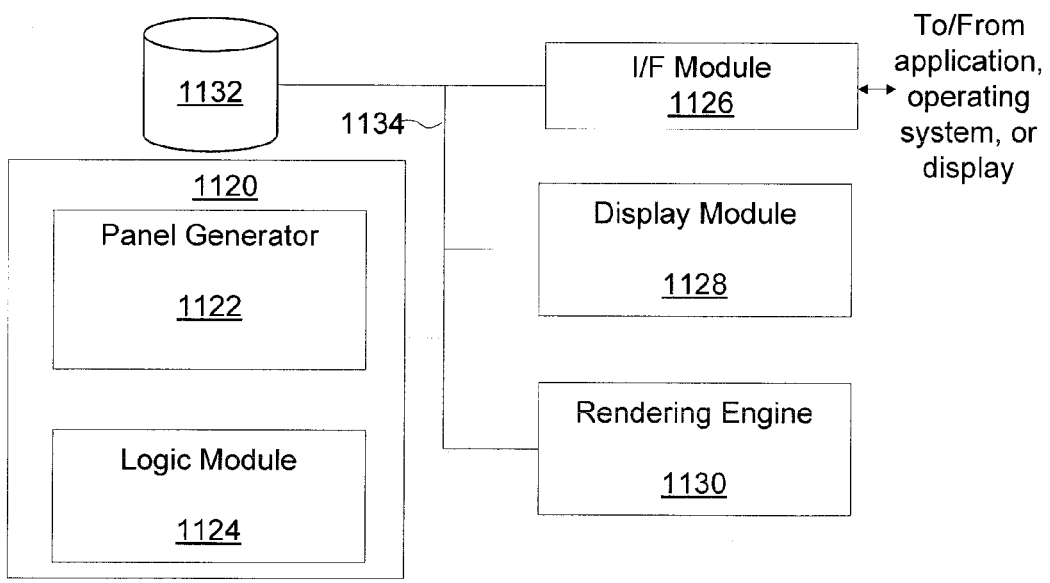
FIG. 11B illustrates an alternative example of a panel presentation application for implementing an interface to provide for generation and transmission of electronic messages, such as electronic facsimiles, according to one embodiment of the invention.

FIG. 11B illustrates an alternative example of a panel presentation application for implementing an interface to provide for generation and transmission of electronic messages, such as electronic facsimiles, according to one embodiment of the invention. Here, application 1120 includes panel generator 1122 and logic module 1124, which can have equivalent functionality as 1112 of FIG. 11A. Further, application 1120 is shown in data communication with interface ("I/F") module 1126, display module 1128, rendering engine 1130, and repository 1132. Data bus 1134 can be configured to send or receive data among application 1120, I/F module 1126, display module 1128, rendering engine 1130, and repository 1132. In other examples, more, fewer or different elements can be used and implemented without limitation to the examples provided above.

In some examples, logic module 1124 and panel generator 1122 can be implemented as part of application 1120, which can be implemented separately from other functional components or modules, such as interface module 1126, display module 1128, rendering module 1130, and repository 1132. Data bus 1134 can be implemented to communicate data over a given port between application 1120 and interface module 1126, display module 1128, rendering module 1130, and repository 1132. In some instances, application 1120 can be implemented as a standalone application or as a component (i.e., module) of another application. Data or information (e.g., content or file data including data representing fax components, fax scheduling information, fax notification policies, routing rules, and the like) associated with a panel can be stored in repository 1132, which can be implemented using a database, data store, data warehouse, or any other type of data repository or structure. In other examples, more, fewer, or different modules can be used to implement the described techniques for panel presentation and are not limited to those provided.

Figure 12A:
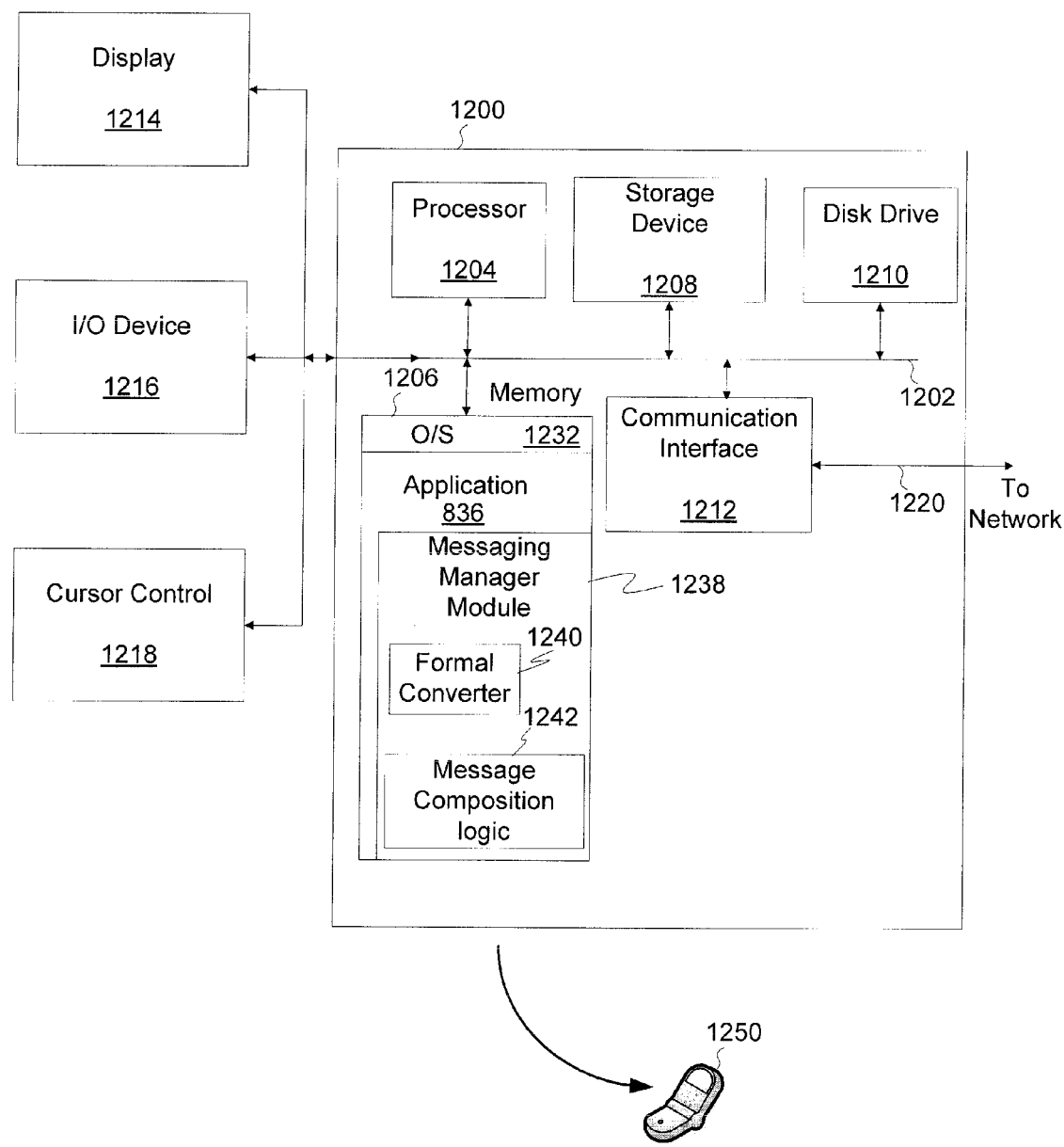
FIG. 12A illustrates an exemplary computer system suitable for generation and transmission of electronic messages, such as electronic facsimiles, according to at least one embodiment of the invention.

FIG. 12A illustrates an exemplary computer system suitable for generation and transmission of electronic messages, such as electronic facsimiles, according to at least one embodiment of the invention. In some examples, computer system 1200 can be used to implement computer programs, applications, methods, processes, or other software to perform the above-described techniques and to realize the structures described herein. Computer system 1200 includes a bus 1202 or other communication mechanism for communicating information, which interconnects subsystems and devices, such as one or more processors 1204, system memory ("memory") 1206, storage device 1208 (e.g., ROM), disk drive 1210 (e.g., magnetic or optical), communication interface 1212 (e.g., a modem, Ethernet card, or any other interface configured to exchange data with a communications network), display 1214 (e.g., CRT or LCD), input device 1216 (e.g., keyboard), and pointer cursor control 1218 (e.g., mouse or trackball). In one embodiment, pointer cursor control 1218 invokes one or more specialized commands to generate an electronic facsimile and to set delivery options (e.g., scheduling delivery time and date). Pointer cursor control 1218 can interact via a pointer cursor with interfaces for a messaging system to create and transmit electronic facsimiles.

According to some examples, computer system 1200 performs specific operations in which processor 1204 executes one or more sequences of one or more instructions stored in system memory 1206. Such instructions can be read into system memory 1206 from another computer readable medium, such as static storage device 1208 or disk drive 1210. In some examples, hard-wired circuitry can be used in place of or in combination with software instructions for implementation. In the example shown, system memory 1206 includes modules of executable instructions for implementing an operation system ("O/S") 1232, an application 1236, and a messaging manager module 1238, which, in turn, can implement a format converter module 1240, and message composition logic 1242 to provide the functionalities described herein.

The term "computer readable medium" and "computer readable media" refer, at least in one embodiment, to any medium or media that participate in providing instructions to processor 1204 for execution. Such a medium or media can take many forms, including but not limited to, non-volatile media, volatile media, and transmission media. Non-volatile media includes, for example, optical or magnetic disks, such as disk drive 1210. Volatile media includes dynamic memory, such as system memory 1206. Transmission media includes coaxial cables, copper wire, and fiber optics, including wires that comprise bus 1202. Transmission media can also take the form of electromagnetic, acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions can be performed by a single computer system 1200. According to some examples, two or more computer systems 1200 coupled by communication link 1220 (e.g., links to LAN, PSTN, or wireless network) can perform the sequence of instructions in coordination with one another. Computer system 1200 can transmit and receive messages, data, and instructions, including program code (i.e., application code) through communication link 1220 and communication interface 1212. Received program code can be executed by processor 1204 as it is received, and/or stored in disk drive 1210, or other non-volatile storage for later execution. In one embodiment, system 1200 (or a portion thereof) can be implemented as a hand-held device, such as a mobile phone 1250. But in other embodiments, system 1200 can be implemented as a personal computer (i.e., a desk top computer) or any other computing device.

FIG. 12B illustrates another exemplary computer system suitable for facilitating generation and transmission of electronic messages, such as electronic facsimiles, according to at least one embodiment of the invention. In some examples, computer system 1280 can be used to implement computer programs, applications, methods, processes, or other software to perform the above-described techniques and to realize the structures described herein. According to at least some embodiments, computer system 1280 can include similar or equivalent functionalities and/or structures as computer system 1200 of FIG. 12A. As shown in FIG. 12B, computer system 1280 includes multiple communication interfaces 1212a and 1212b, and others not shown (e.g., a radio receiver to receive global positioning signals ("GPS")). In at least some embodiments, communication interface 1212a can provide a communication link 1220a to a network ("1") one, such as digital cellular network, and communication interface 1212b can provide a communication link 1220b to a network ("2") two, such as n IP network.

In the example shown, system memory 1206 can include modules of executable instructions for implementing an messaging system transceiver module 1260 that is configured to communicate with messaging systems described herein. In one embodiment, system 1280 (or a portion thereof) can be implemented as a hand-held device, such as a mobile phone 1250. But in other embodiments, system 1280 can be implemented as a personal computer (i.e., a desk top computer) or any other computing device. Messaging system transceiver module 1260 can use digital transmission cellular circuitry (e.g. communication interface 1212b) to transmit data representing user inputs for creating and transmitting electronic facsimiles along with or separate from (e.g., in parallel or in series) call data sent over any of the multiple networks, including IP and digital cellular networks.

Figure 13:
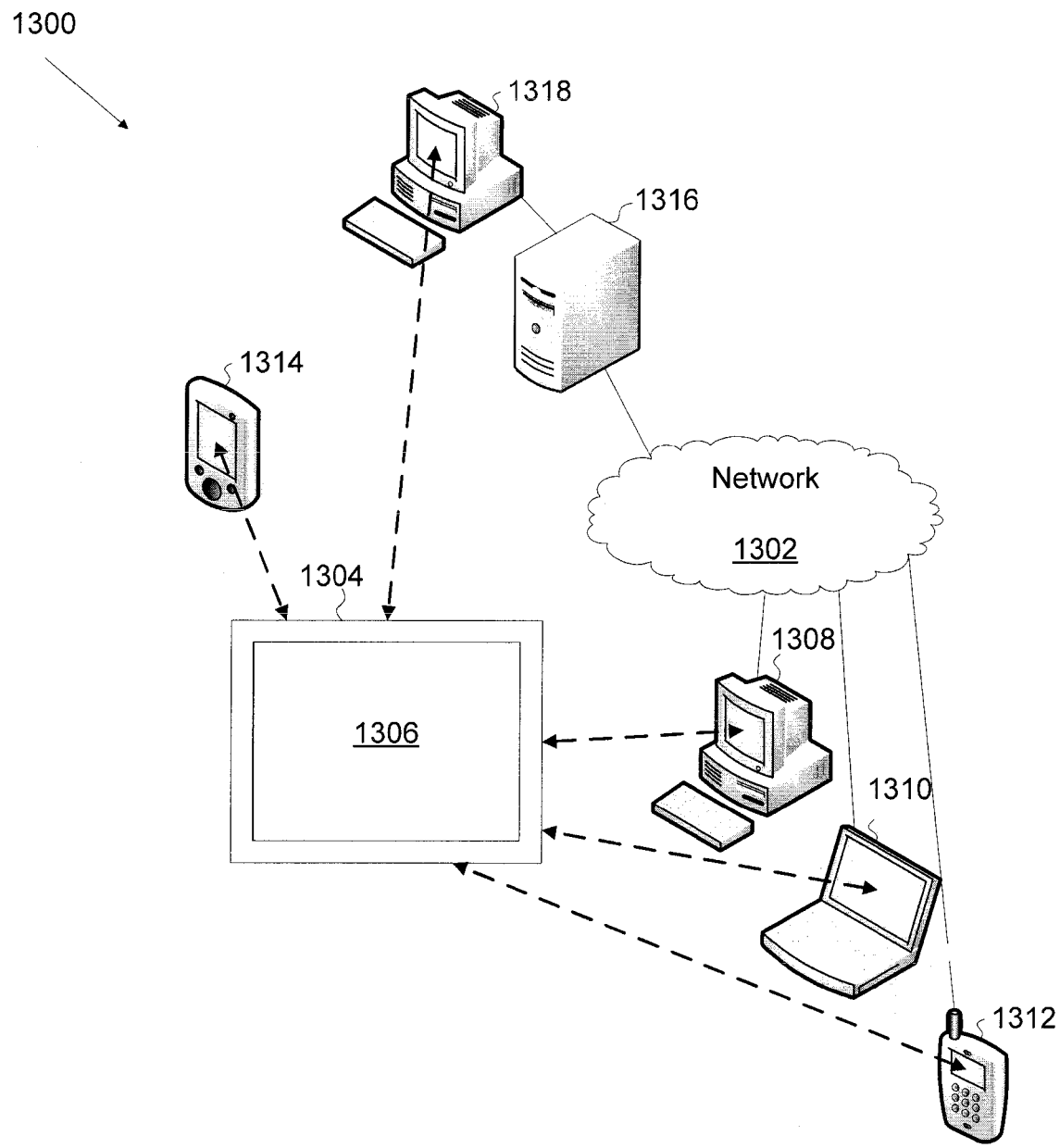
FIG. 13 illustrates an example of an interface for facilitating the generation and transmission of electronic messages with endpoints via the interface, according to various embodiment of the invention.

FIG. 13 illustrates an example of an interface for facilitating the generation and transmission of electronic messages with endpoints via the interface, according to various embodiment of the invention. Here, system 1300 includes network 1302, display environment 1304, interface 1306, which can be presented on devices such as computer 1308, notebook computer ("notebook" or "laptop") 1310, smart phone 1312, personal digital assistant ("PDA") 1314, server 1316, and administrator computer 1318. In other examples, the number and type of devices can be varied and are not limited to those shown and described.

In some examples, one or more panels for the generation and transmission of electronic messages and/or call communication (e.g., using interface 1306 for connecting calls, sending electronic messages, etc.) can be presented on interface 1306, which can be an interface for an application, such as a video and audio editing application, or as a web browsing program, Internet content portal, client or desktop application for any purpose. Panels can be used to provide additional or supplemental information that can be contextually relevant to another panel presented in interface 1306. Computer 1308, notebook computer ("notebook" or "laptop") 1310, smart phone 1312, personal digital assistant ("PDA") 1314, server 1316, and administrator computer 1318 can provide content data for rendering content as well as other data, which can be implemented to generate, for example, user inputs configured to accept data to generate and transmit electronic messages, such as electronic facsimiles, and to answer and make phone calls. In some cases, an operating system installed on computer 1308 can communicate (i.e., via an application programming interface ("API")) content data and/or other related data to another application installed on computer 1308 to render (i.e., interpreting data and information to draw or display the content in an interface) one or more panels presented in interface 1306. In some examples, different types of panels can be rendered in interface 1306. In one embodiment, interface 1306 can include any number and/or any type of display environments, such as CRT and LCD displays. Note that the above-described system and elements can be varied and are not limited to the descriptions or examples provided.

In at least some of the embodiments of the invention, the structures and/or functions of any of the above-described interfaces and panels can be implemented in software, hardware, firmware, circuitry, or a combination thereof. Note that the structures and constituent elements shown in FIGS. 11A to 13, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

In accordance with at least one embodiment, an example of a method can include displaying an interface having an input field to accept user input, generating an electronic facsimile, responsive to the user input, and transmitting the electronic facsimile over switched networks or packet networks. Optionally, the method can include associating one or more electronic components with the electronic facsimile, and converting the format of the electronic components into another format. Optionally, the method can include accepting the electronic facsimile components form a softphone, forming the electronic components into a facsimile in a message system, and accepting transmission of the electronic facsimile association with an email. Optionally, the method can include making known meta-definition language formats, collecting populated meta-definition language formats, and converting populated meta-definition language formats into facsimile components. Optionally, the method can include one or more of the following: accepting dual-tone multi-frequency and audio selections and audio dictation in response to media prompts to populate facsimile components, and converting audio dictation into text to augment the facsimile components.

In accordance with at least one embodiment, a messaging system can include a repository for storing electronic messages, and a plurality of servers configured to compose an electronic facsimile as one of the electronic messages, and convert the format of the electronic facsimile. In another embodiment, a computer readable medium can include executable instructions to display an interface having an input field to accept user input, generate an electronic facsimile, responsive to the user input, that is configured to transmit over switched networks or packet networks, associate an electronic document with the electronic facsimile, and convert the format of the electronic document into another format. In still yet another embodiment, a computer readable medium can include executable instructions to display an interface having input fields to accept sending user notification device and policy selections, generate notifications on error conditions and completed fax transmissions according to sending user device and policy selections, and repeat notifications until sending user confirmation. In one embodiment, a computer readable medium can include executable instructions to display an interface having input fields to accept receiving user notification device and policy selections, generate notifications of attempted and completed fax transmissions according to sending user device and policy selections, and repeat notifications until receiving user confirmation.

In at least some of the embodiments of the invention, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

What is claimed:

1. A method of generating electronic facsimiles using a processor, the method comprising:
    receiving data representing an electronic document in a file format into a messaging system;
    converting a first subset of fax components to a fax compatible format including the electronic document in the file format to form a first subset of converted fax components;
    storing at least one converted fax component of the first subset of converted fax components as a pre-rendered fax component;
    receiving a request to generate an electronic facsimile corresponding to the electronic document to include the pre-rendered fax component;
    converting a second subset of fax components to the fax compatible format at a different time than the conversion of the first subset of fax components to form a second subset of converted fax components;
    associating a converted fax component from the second subset of converted fax components with the pre-rendered fax component;
    generating the electronic facsimile to include both the pre-rendered fax component and the converted fax component from the second subset of converted fax components based on the association of the converted fax component from the second subset of converted fax components with the pre-rendered fax component;
    transmitting the electronic facsimile;
    converting a third subset of fax components to the fax compatible format to form a third subset of converted fax components at a different time than the first subset of converted fax components and the second subset of converted fax components;
    associating a converted fax component from the third subset of fax components with the pre-rendered fax component; and
    generating a second electronic facsimile to include both the pre-rendered fax component and the converted fax component from the third subset of converted fax components based on the association of the converted fax component from the third subset of fax components with the pre-rendered fax component; and
    transmitting the second electronic facsimile.

2. The method of claim 1, wherein converting the second subset of fax components to form the converted fax component further comprises:
    rendering dynamically the second subset of fax components responsive to the request to form the converted fax component as a dynamically-rendered fax component.

3. The method of claim 2 further comprising:
    generating the electronic facsimile to include the pre-rendered fax component and the dynamically-rendered fax component.

4. The method of claim 1 wherein the first subset of the fax components comprise:
    data representing at least a portion of a cover sheet.

5. The method of claim 1 further comprising:
    storing the first subset of converted fax components and the second subset of converted fax components as pre-rendered fax components prior to generating the electronic facsimile; and
    generating the electronic facsimile including the pre-rendered fax components as a pre-rendered electronic facsimile.

6. The method of claim 5 wherein the second subset of converted fax components comprise:
    the data representing the electronic document.

7. The method of claim 1, wherein converting the second subset of fax components form the second subset of converted fax components further comprises:
    rendering dynamically the second subset of fax components responsive to the request to form dynamically-rendered fax components; and
    affixing a time and date stamp as the dynamically-rendered fax components prior to transmitting the electronic facsimile.

8. The method of claim 1 further comprising:
    storing either the first subset of the fax components or the second subset of the fax components, or both, prior to converting either the first subset of the fax components or the second subset of the fax components, or both, to the first subset of converted fax components and the second subset of converted fax components.

9. The method of claim 5 further comprising:
    storing the first subset of the fax components or the second subset of the fax components constituting a pre-rendered electronic facsimile,
    wherein the first subset of the fax components or the second subset of the fax components, or both, are stored as separable fax components.

10. The method of claim 1 further comprising:
    transmitting data to present an interface configured to accept a first user input; and
    receiving the electronic document as the first user input.

11. The method of claim 1 further comprising:
    transmitting data to accept at least one of dual-tone multi-frequency input and audio selections as audio input;
    receiving the audio input into the messaging system; and
    converting the audio input into alpha-numeric text to form at least a subset of the fax components.

12. A system for supporting message delivery over a communications network, the system comprising:
    a messaging system further comprising:
        a plurality of processing servers, at least one of which is configured to receive a user input to create an electronic facsimile over a communications network from a sending communications device;

at least one repository, wherein the messaging system is configured to:

format the user input into a pre-rendered electronic document in a fax format, store the pre-rendered electronic document in the repository, wherein the pre-rendered electronic document is pushed for transmission by a fax resource selected by the repository, generate dynamically a first dynamically-rendered fax component at a different time than formatting of the pre-rendered electronic document, associate the first dynamically-rendered fax component with the pre-rendered electronic document, integrate the first dynamically-rendered fax component to the pre-rendered electronic document based on the association of the first dynamically-rendered fax component with the pre-rendered electronic document, transmit the pre-rendered electronic document integrated with the first dynamically-rendered fax component, generate dynamically a second dynamically-rendered fax component at a different time than the formatting of the pre-rendered electronic document and the generating of the first dynamically-rendered fax component, associate the second dynamically-rendered fax component with the pre-rendered electronic document, integrate the second dynamically-rendered fax component to the pre-rendered electronic document based on the association of the second dynamically-rendered fax component with the pre-rendered electronic document, and transmit the pre-rendered electronic document integrated with the second dynamically-rendered fax component, wherein the messaging system is coupled to the communications network for transmitting the pre-rendered electronic document as an electronic facsimile.

13. The system as in claim 12 wherein the messaging system is further configured to:

transmit the at least one pre-rendered electronic document as a function of either a schedule based on the user input, or upon availability of the fax resource, or both.

14. The systems as in claim 13 wherein the messaging system is configured to accept a schedule from a user of the transmission of the pre-rendered electronic document as an electronic facsimile according to at least one of a least cost route, least cost time, and least cost day.

15. The system as in claim 13 further comprising:

at least one of the plurality of processing servers including:

a rendering server coupled with the at least one repository and configured to pre-render the user input into the at least one pre-rendered electronic document in a common fax format.

16. The system as in claim 13 wherein:

the repository is coupled with a rendering server and with at least one of a web server, a synchronization server, and a fax polling server, each of which can be configured to upload a request for an electronic facsimile to the repository; and the repository also is coupled with a database server and a fax router so that the database server coupled with the repository can request that the fax router select a preferred delivery route and corresponding delivery resource for transmitting the electronic facsimile.

17. The system as in claim 13 wherein the sending communications device is a computing device configured to accept the user input.

18. The system as in claim 13 wherein the communications network is a switched network or a packet network.

19. The system as in claim 13 wherein the message system is configured to affix a time and date stamp to the at least one pre-rendered electronic document.

20. A system for supporting a message delivery service comprising:

at least one receiving communications device configured to receive an audio input to create electronic messages over a communications network from a sending communications device;

a receiving media server configured to communicate with an interface of the sending communications device;

a prompt-and-collect logic coupled with the receiving media server further configured to provide automated speech recognition technology to generate an electronic document by accepting the audio input;

a rendering server configured to format the electronic document into a pre-rendered electronic document in a common fax format, wherein the pre-rendered document can become an electronic facsimile or a component of an electronic facsimile, wherein the rendering server is further configured to:

generate dynamically a first dynamically-rendered fax component as a portion of a dynamically-rendered message at a different time than the formatting of the pre-rendered electronic document, associate the first dynamically-rendered fax component with the pre-rendered electronic document, affix the first dynamically-rendered fax component to the pre-rendered electronic document to create a first electronic message, generate dynamically a second dynamically-rendered fax component as a portion of a dynamically-rendered message at a different time than the formatting of the pre-rendered electronic document and the generation of the first dynamically-rendered fax component, associate the second dynamically-rendered fax component with the pre-rendered electronic document, affix the second dynamically-rendered fax component to the pre-rendered electronic document to create a second electronic message;

at least one repository for storing pre-rendered electronic messages;

at least one fax application server, wherein the at least one fax application server responds to a request from the repository for transmission of the first and second electronic messages as electronic facsimiles.

* * * * *